(12) United States Patent
Nakao et al.

(10) Patent No.: US 7,164,342 B2
(45) Date of Patent: Jan. 16, 2007

(54) LOAD SENSOR AND METHOD OF MANUFACTURING THE LOAD SENSOR, PASTE USED FOR THE METHOD, AND METHOD OF MANUFACTURING THE PASTE

(75) Inventors: Keiichi Nakao, Osaka (JP); Yukio Mizukami, Fukui (JP); Hiroaki Ishida, Fukui (JP); Masaaki Katsumata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

(21) Appl. No.: 10/499,886

(22) PCT Filed: Aug. 7, 2003

(86) PCT No.: PCT/JP03/10077

§ 371 (c)(1),
(2), (4) Date: Jun. 30, 2004

(87) PCT Pub. No.: WO2004/015384

PCT Pub. Date: Feb. 19, 2004

(65) Prior Publication Data

US 2005/0085393 A1    Apr. 21, 2005

(30) Foreign Application Priority Data

| Aug. 7, 2002 | (JP) | ............................ 2002-229753 |
| Aug. 8, 2002 | (JP) | ............................ 2002-231389 |
| Aug. 21, 2002 | (JP) | ............................ 2002-240135 |
| Jul. 16, 2003 | (JP) | ............................ 2003-197554 |

(51) Int. Cl.
*H01C 10/10* (2006.01)

(52) U.S. Cl. ........................................ 338/47; 338/308

(58) Field of Classification Search .................... 338/2, 338/4, 13, 36, 42, 47, 114, 308; 501/20, 501/21; 505/100; 428/210; 73/721, 718; 361/283

See application file for complete search history.

(56) References Cited

U.S. PATENT DOCUMENTS

| 4,812,422 A | 3/1989 | Yuhaku et al. |
| 4,973,986 A * | 11/1990 | Narita ........................ 338/308 |
| 5,050,034 A | 9/1991 | Hegner et al. |

(Continued)

FOREIGN PATENT DOCUMENTS

| JP | 2-173073 A | 7/1990 |
| JP | 5-72017 A | 3/1993 |
| JP | 6-81813 A | 10/1994 |

(Continued)

OTHER PUBLICATIONS

Search Report dated Aug. 8, 2006.

*Primary Examiner*—Tu Hoang
(74) *Attorney, Agent, or Firm*—McDermott Will & Emery LLP

(57) ABSTRACT

The present invention relates to a load sensor and provides a highly accurate load sensor with multi-layered wiring at low costs. It provides crystallized glass and non-crystalline glass which are best for a load sensor, and combines these to form multi-layered wiring, and further, makes a glass layer of composite type as needed, and reduces uneven printing in printing multiple layers with use of hardening type paste.

1 Claim, 17 Drawing Sheets

U.S. PATENT DOCUMENTS

| | | | |
|---|---|---|---|
| 5,406,852 A * | 4/1995 | Hiraka et al. | 338/114 |
| 5,766,741 A | 6/1998 | Kawakami et al. | |
| 5,898,359 A | 4/1999 | Ellis | |
| 5,985,183 A | 11/1999 | Hori et al. | |
| 6,103,452 A | 8/2000 | Kakinuma et al. | |
| 6,345,543 B1 | 2/2002 | Aoki | |
| 2006/0001521 A1 * | 1/2006 | Nakai et al. | 338/2 |

FOREIGN PATENT DOCUMENTS

| | | |
|---|---|---|
| JP | 6-321619 A | 11/1994 |
| JP | 7-146192 A | 6/1995 |
| JP | 9-153435 A | 6/1997 |
| JP | 9-243472 A | 9/1997 |
| JP | 11-297123 A | 10/1999 |
| WO | WO 96/06811 | 3/1996 |

* cited by examiner

LOAD SENSOR AND METHOD OF MANUFACTURING THE LOAD SENSOR, PASTE USED FOR THE METHOD, AND METHOD OF MANUFACTURING THE PASTE

TECHNICAL FIELD

The present invention relates to a load sensor which is disposed under the seat of a car for measuring the weight of the person and for measuring a smart air bag that adjusts the operation of the air bag according to the weight or various loads, and its manufacturing method, glass paste used for the same and its manufacturing method.

BACKGROUND ART

Conventionally, a load sensor formed with a strain sensitive resistor on a metallic board via a glass layer is proposed in Japanese Laid-open Patent H5-45238, etc.

FIG. 17 is a sectional view describing the structure of a conventional load sensor, which is an example of load sensor with a single layer wiring. In FIG. 17, glass enamel 2 is formed on elastic metal body 1, on which wiring 3a and strain sensitive resistor 4 are formed. However, when crystalline glass is used for glass enamel 2 in particular, it is well-known that increasing the degree of crystallization of the deposited crystal causes the surface to roughen.

In Japanese Laid-open Patent H6-137805, in order to reduce such surface roughening of crystallized glass, a metal alkoxide layer is formed on a crystallized glass layer to lessen the surface roughness. And it is proposed that a wiring pattern and strain sensitive resistor are formed thereon.

However, since a metal alkoxide layer is lower in strength and layer quality as compared with ordinary glass, it is difficult to use when high reliability and strength are required. Also, since a metal alkoxide layer itself and a strain sensitive resistor based on ruthenium oxide ($RuO_2$) are liable to diffuse to each other, there is a problem such that the gauge factor (variation in resistance value against strain) of the strain sensitive resistor or TCR (temperature change rate of resistance value) are liable to be affected.

Here, the problems of crystallized glass proposed for a load sensor are further described in detail. Table 1 shows the composition of crystallized glass for single wiring layer proposed in Japanese Laid-open Patent H6-137805 and Japanese Patent No. 2979757. MgO is 16 to 50 wt (weight) %, BaO is 0 to 50 wt %, CaO is 0 to 20 wt %, $La_2O_3$ is 0 to 40 wt %, $B_2O_3$ is 5 to 34 wt %, $SiO_2$ is 7 to 30 wt %, $MO_2$ (M is at least one of Zr, Ti, Sn) is 0 to 5 wt %, and $P_2O_5$ is 0 to 5 wt %.

TABLE 1

| Glass component | Total composition (wt %) |
| --- | --- |
| MgO | 16 to 50 |
| BaO | 0 to 50 |
| CaO | 0 to 20 |
| $La_2O_3$ | 0 to 40 |
| $B_2O_3$ | 5 to 34 |
| $SiO_2$ | 7 to 30 |
| M(Zr, Ti, Sn)$O_2$ | 0 to 5 |
| $P_2O_5$ | 0 to 5 |

Also, besides these, the compositions of similar crystallized glass are proposed in Japanese Laid-open Patent H8-178768, Japanese Laid-open Patent H8-304200, Japanese Laid-open Patent H8-145814, and Japanese Laid-open Patent H9-8325.

However, when a strain sensitive resistor is directly formed on crystallized glass, there arises a problem that the characteristics are liable to vary because of surface roughening. In order to reduce the surface roughening of crystallized glass, for example, proposed in Japanese Laid-open Patent H6-13780 is to form a metal alkoxide layer on a crystallized glass layer for lessening the surface roughness. And to form a wiring pattern and strain sensitive resistor thereon is proposed.

However, a metal alkoxide layer is lower in strength and layer quality as compared with ordinary glass, and it is difficult to use when high reliability and strength are required. Also, since metal alkoxide layer itself and strain sensitive resistor based on $RuO_2$ are liable to diffuse to each other, there arises a problem such that the gauge factor (variation in resistance value against strain) of strain sensitive resistor and TCR (temperature change rate of resistance value) are liable to be affected. Also, such materials are originally not intended to achieve the purpose of forming multi-layers, and unexpected problems are liable to arise when multiple layers are formed.

Also, in U.S. Pat. No. 5,898,359, forming an interface layer is proposed as a method of suppressing the influence of mutual diffusion between glass layer and resistor.

FIG. 18 describes the method of forming an interface layer, in which formed on elastic metal body 1 are glass layer 5, wiring 3b and strain sensitive resistor 4 via interface layer 6.

In Japanese Patent No. 3010166, proposed as the interface layer 6 are those containing granular alumina and granular zinc oxide which are suspended in glass matrix.

Table 2 is the composition of interface layer 8 proposed in Japanese Patent No. 3010166. Alumina is 15 wt (weight) % to 35 wt %, zinc oxide is 3 wt % to 6 wt %, glass frit mixture is 34 wt % to 53 wt %.

TABLE 2

| Glass component | Total composition (wt %) |
| --- | --- |
| Alumina | 15 to 35 |
| Zinc oxide (ZnO) | 3 to 6 |
| Glass frit mixture | 34 to 53 |

Table 3 shows the composition of the glass frit mixture. Lead oxide ranges from 50 wt (weight) % to 74 wt % (as interface layer, from 17 wt % to 39 wt %), boron oxide ranges from 10 wt % to 25 wt % (ditto, from 3 wt % to 13 wt %), and silica ranges from 8 wt % to 26 wt % (ditto, from 2 wt % to 14 wt %).

TABLE 3

| Glass component | Total composition (wt %) |
| --- | --- |
| Lead oxide (PbO) | 50 to 74 |
| Boron oxide ($B_2O_3$) | 10 to 25 |
| Silica ($SiO_2$) | 8 to 26 |
| Alumina ($Al_2O_3$) | 0 to 12 |
| Titania, etc. | 0 to 3 |

Also, Table 4 shows the result of rearrangement of Table 2 and Table 3. The composition of interface layer 8 shown in Japanese Patent No. 3010166 can be re-calculated as follows: alumina is 15 to 41.4 wt %, zinc oxide is 3 to 6 wt %, lead oxide is 17 to 39.2 wt %, boron oxide is 2.7 to 13.8 wt %, silica is 0 to 6.4 wt %, and tetania, etc. is 0 to 1.6 wt %. Also, in Japanese Patent No. 3010166, proposed is a method of increasing gauge rates by including both of alumina and zinc oxide in glass.

TABLE 4

| Glass component | Total composition (wt %) |
| --- | --- |
| Alumina ($Al_2O_3$) | 15 to 41.4 |
| Zinc oxide (ZnO) | 3 to 6 |
| Lead oxide (PbO) | 17 to 39.2 |
| Boron oxide ($B_2O_3$) | 2.7 to 13.8 |
| Silica ($SiO_2$) | 0 to 6.4 |
| Titania, etc. | 0 to 1.6 |

However, in Japanese Patent No. 3010166, it is possible to stabilize the characteristics of the resistor, but there arises a problem as described later in FIG. 20 when wiring is formed in multiple layers because problems in forming multi-layer wiring are not taken into consideration.

For the purpose of matching with such strain sensitive resistor, proposed is non-crystalline glass. In Japanese Laid-open Patent H9-243472, proposed is to use borosilicate lead glass instead of crystallized glass for the manufacture of a load sensor with a single wiring layer. In Japanese Laid-open Patent H9-243472, proposed is to form a multi-layer insulating layer of three layers by repeating printing, burning, printing, and burning of an insulating layer of borosilicate lead glass having layer thickness of 30 μm or less per layer. However, in the case of borosilicate lead glass, as mentioned in Japanese Laid-open Patent H9-243472, it is well-known that burning a layer having thickness of about 40 μm is liable to cause internal cracking to take place.

Also, proposed in Japanese Laid-open Patent H11-326090 is a load sensor with single wiring layer. However, in the structure of a conventional load sensor with such a single wiring layer, since there is no freedom of designing the wiring, it is difficult to mount semiconductors and chip parts in high density on a load sensor board.

Further, as proposed in Japanese Laid-open Patent H11-351952 (U.S. Pat. No. 6,345,543), etc., a load sensor with various parts mounted on the board thereof is desirable to be mounted in a car. However, since an elastic metal body is directly fixed on the chassis of the car, it may be liable to pick up noise from the car. In order to solve such problem, for example, in Japanese Laid-open Patent 2003-97997, proposed is to form wiring in multiple layers for the purpose of improving EMI (electromagnetic interference) of a load sensor to be mounted in a car.

FIG. 19 is a sectional view showing an example of a load sensor with multi-layered wiring. In FIG. 19, a plurality of lower glass 7a, 7b and 7c are formed on elastic metal body 1, on which internal electrode 9a is formed, and further, a plurality of layers of upper glass 8a, 8b and 8c are formed thereon so as to cover the internal electrode 9a. And wiring 10a and strain sensitive resistor 12 are formed on the upper glass 8c, which are protected by protective layers 11a, 11b and 11c. To form such wiring of a load sensor in multiple layers is absolutely needed for miniaturization of the load sensor and for realizing higher function (for example, mounting semiconductor chips and various chip parts in high density on a load sensor board) besides the measure against EMI, and a conventional load sensor with single wiring layer is not enough to meet such requirement. When wiring is formed in multiple layers, as proposed in Japanese Laid-open Patent 2003-97997, it is possible to repeat printing and burning for each layer in order to form multiple layers, but there is a problem of manufacturing costs. Accordingly, desired is simultaneous burning of multiple layers.

FIG. 20 is a diagram for explaining the problems when a load sensor is multi-layered. The same portions as in FIG. 19 are given same reference numerals, and reference numeral 11d is a protective layer. Above all, explained is how crack 13 is generated between layers or in a layer. In the experiment executed by the inventor et al, it has been found that such crack 13 is liable to be generated when different kinds of glass are multi-layered.

For example, when glass layers being different in thermal expansion coefficient or non-crystalline glass and crystalline glass are combined in a sandwich fashion, cracks are liable to be generated between these layers. Also, it has been found that such problem is liable to arise when a plurality of glass layers are simultaneously burnt. Thus, when layers are individually burnt layer by layer, then problems hardly arise but the manufacturing cost becomes very high.

On the other hand, even if intended to realize cost down by burning many layers at one time, there will arise various problems such as ink leveling in multi-layer printing and matching of thermal expansion in multi-layer burning, and it has been unable to overcome such problems by employing glass materials and manufacturing processes for a load sensor conventionally proposed.

In prior art, since the load sensor proposed uses single-layer wiring, it is unable to cope with the market requirement for higher performance. Therefore, there has been a demand for a load sensor using multi-layered wiring. However, in the case of conventional materials, it is difficult to form multiple layers of wiring, and further, as the number of layers increases, there arises a problem of manufacturing cost down.

DISCLOSURE OF THE INVENTION

The present invention provides a load sensor which is able to easily form multiple layers of wiring of the load sensor and also to realize the manufacturing cost down, and its manufacturing method.

Also, using crystalline glass suited for forming multiple layers as a glass material coming in contact with a metal substrate at least, it is intended to prevent cracking in re-burning and to improve the mechanical strength. Also, forming non-crystalline glass under a strain sensitive resistor at least, it is possible to realize matching with the strain sensitive resistor which has been a problem to be solved in conventional crystalline glass. With respect to elastic metal bodies different in thermal expansion coefficient, it is possible to improve the matching characteristic in simultaneous burning between crystallized glass and metallic substrate or crystallized glass and non-crystalline glass. In this way, the application range of the product may be expanded, and further, using various pastes of hardening type, it is possible to improve the leveling property of printed layers in screen printing of multiple layers. Accordingly, pinholes of the printed layers can be reduced and it is possible to increase the yield of products and the burning cost, and the purpose is to provide an inexpensive load sensor which assures high performance and low cost.

In order to achieve the purpose, an example of the present invention has the following configuration.

The present invention is a load sensor configured in that a crystalline glass layer of 10 to 200 μm thick is formed on an elastic metal body, and a non-crystalline glass layer of 5 to 100 μm thick is formed on the crystalline glass layer, and silver wiring and strain sensitive resistor of 5 to 50 μm thick each are formed on the non-crystalline glass layer in such manner as to partially overlap each other. The elastic metal body is connected to a part of the silver wiring via holes formed in the crystalline glass layer and the non-crystalline glass layer, and a protective layer of 200 μm or less in thickness is formed so as to cover the strain sensitive resistor at least. Further, since a strain sensitive resistor is formed via a non-crystalline glass on a glass layer formed on an elastic metal body, the strain sensitive resistor comes in direct contact with crystalline glass, and thereby, it is possible to provide a highly accurate load sensor which may prevent the variation of characteristics.

Also, the present invention is configured in that an internal electrode of less than 50 μm in thickness is buried in an elastic metal body, while crystalline glass layers of 10 to 200 μm thick are respectively formed on the upper and lower surface thereof. On the crystalline glass layer is formed a non-crystalline glass layer of 5 to 100 μm thick, and on the non-crystalline glass layer are formed a silver wiring and strain sensitive resistor of 5 to 50 μm thick. Further, via holes formed in the crystalline glass layer and non-crystalline glass layer, the internal electrode is connected to a part of the wiring. Further, the load sensor is configured in that a protective layer of 200 μm or less in thickness is formed so as to cover at least the strain sensitive resistor, wherein an internal electrode is buried in crystallized glass, and thereby, it is possible to improve the EMI characteristics of the load sensor and also to prevent the generation of cracks in simultaneous burning of multiple layers. Since a strain sensitive resistor is formed on crystalline glass via non-crystalline glass, it provides a highly accurate load sensor which is able to prevent the variation of characteristics caused when the strain sensitive resistor comes in direct contact with the crystalline glass.

Also, the present invention is configured in that a first crystallized glass paste of 10 to 300 μm thick is printed on an elastic metal body, followed by burning together at 800 to 900° C., and further, a non-crystalline glass paste of 10 to 300 μm thick is further printed thereon and burnt at 800 to 900° C., and further, wiring and strain sensitive resistor are printed thereon and individually burnt at 800 to 900° C., and a glass paste is printed so as to cover at least the strain sensitive resistor and burnt at 400 to 700° C., followed by mounting specified electronic parts thereon. Even in case the first crystallized glass paste is printed in a plurality of layers, the plurality of layers can be burnt all together, bringing about such effect that the load sensor manufacturing cost can be reduced.

Also, as to the non-crystalline glass paste in the present invention, the glass composition is such that $SiO_2$ ranges from 60 to 80 wt %, CaO from 5 to 15 wt %, PbO from 3 to 15 wt %, alumina from 1 to 10 wt %, $ZrO_2$ from 2 to 10 wt %, and the average grain diameter ranges from 0.1 to 5 μm, the glass density in the paste ranges 60 to 80 wt %, which is dispersed in the vehicle of solvent and resin. In this way, as a load sensor, it is possible to provide high-quality non-crystalline glass paste that can be burnt all together and to improve the product quality of the load sensor, thereby bringing about such effect that the load sensor manufacturing cost can be lowered.

Also, as to the crystalline glass paste in the present invention, the glass composition is such that MgO ranges from 30 to 55 wt %, $B_2O_3$ from 5 to 30 wt %, $SiO_2$ from 10 to 25 wt %, BaO from 5 to 25 wt %, alumina from 1 to 30 wt %, CaO from 0 to 6 wt %, $ZrO_2$, $SnO_2$ are in a range of 0 to 5 wt %, and the average grain diameter ranges from 0.1 to 5 μm, the glass density in the paste ranges 60 to 80 wt %, which is dispersed in the vehicle of solvent and resin. In this way, as a load sensor, it is possible to provide high-quality crystallized glass paste that can be burnt all together and to improve the product quality of the load sensor, thereby bringing about such effect that the load sensor manufacturing cost can be lowered.

BRIEF DESCRIPTION OF THE INVENTION

Figure 7:
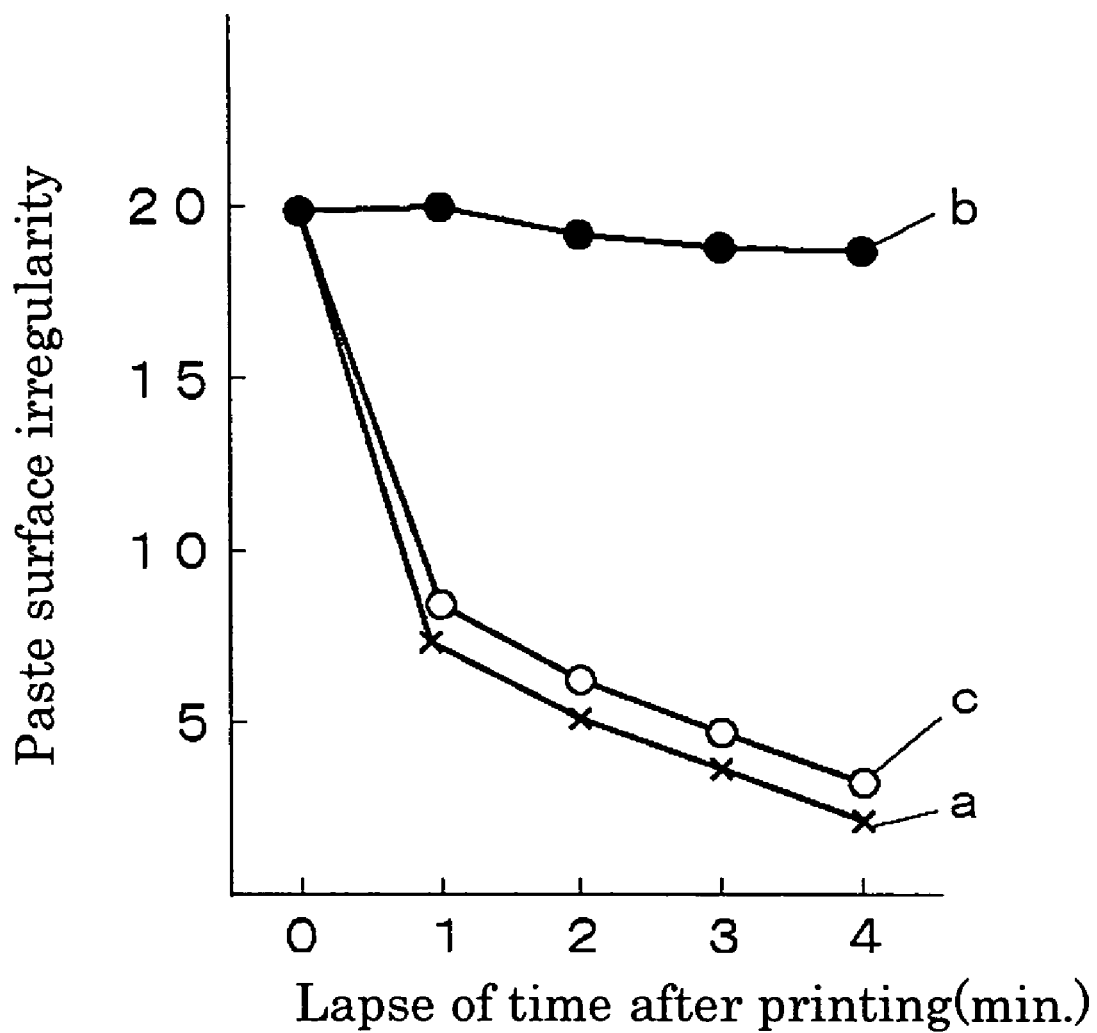

FIG. 7 explains about leveling.

Figure 8A:
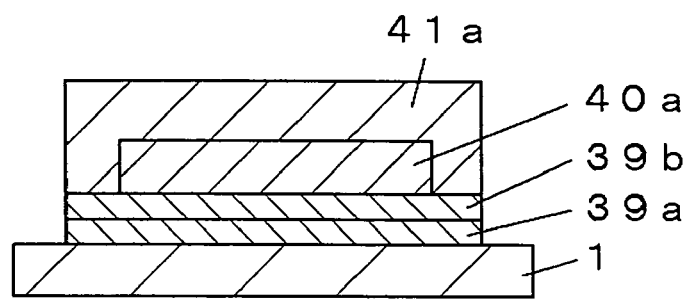
Figure 8B:
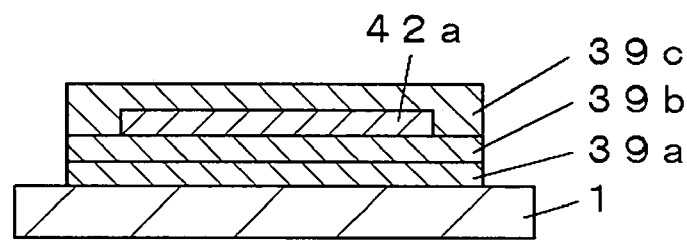
Figure 8C:
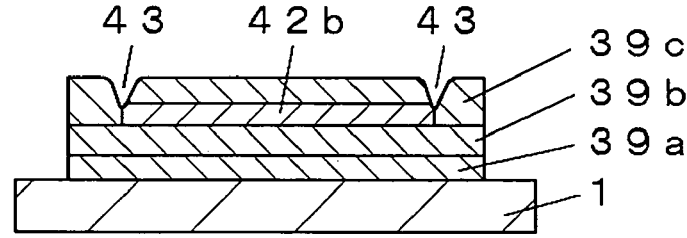

FIG. 8A to FIG. 8C are sectional views showing how to simultaneously burn a plurality of layers of internal electrode and glass.

Figure 9A:
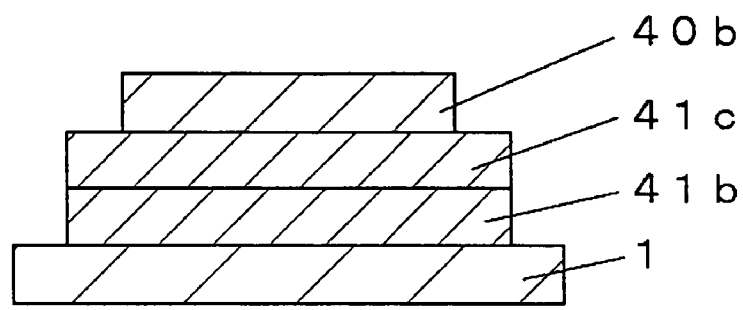
Figure 9B:
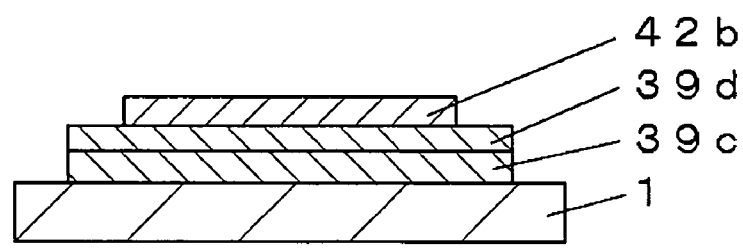
Figure 9C:
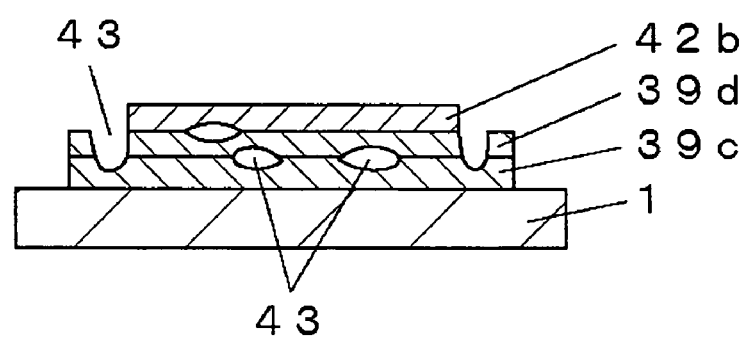

FIG. 9A to FIG. 9C are sectional views showing how to burn the plurality of layers, the internal electrode together with crystallized glass that serves as a surface.

Figure 10A:
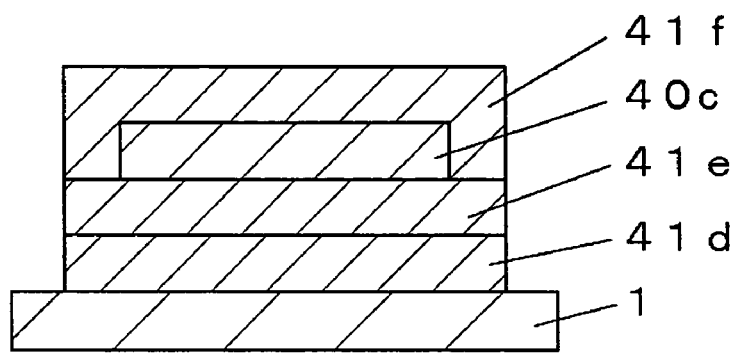
Figure 10B:
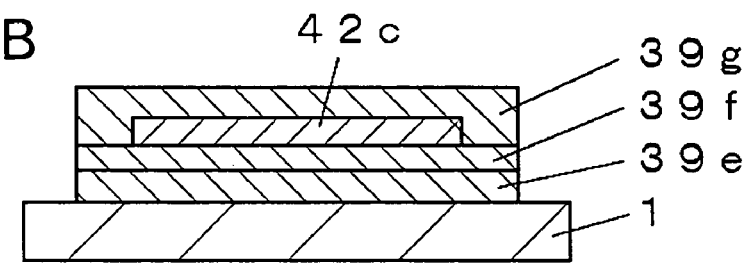
Figure 10C:
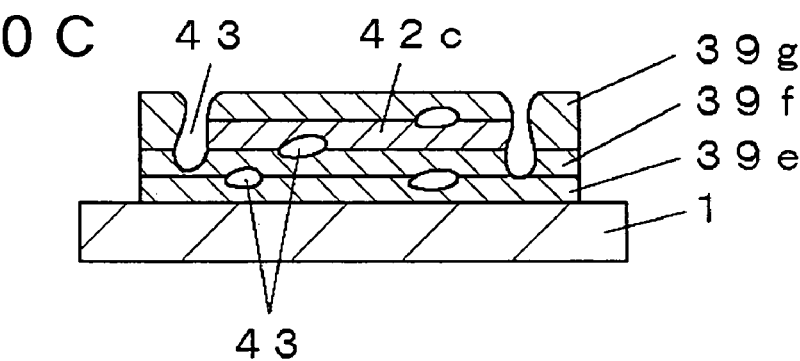

FIG. 10A to FIG. 10C are sectional views showing how to burn the plurality of layers all together with the internal electrode vertically sandwiched between crystallized glass layers.

Figure 11A:
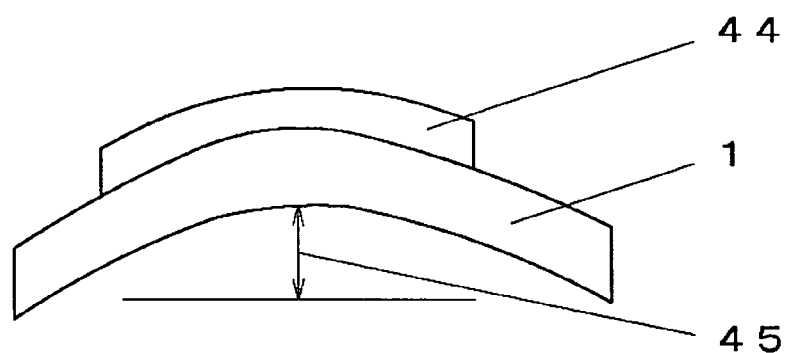
Figure 11B:
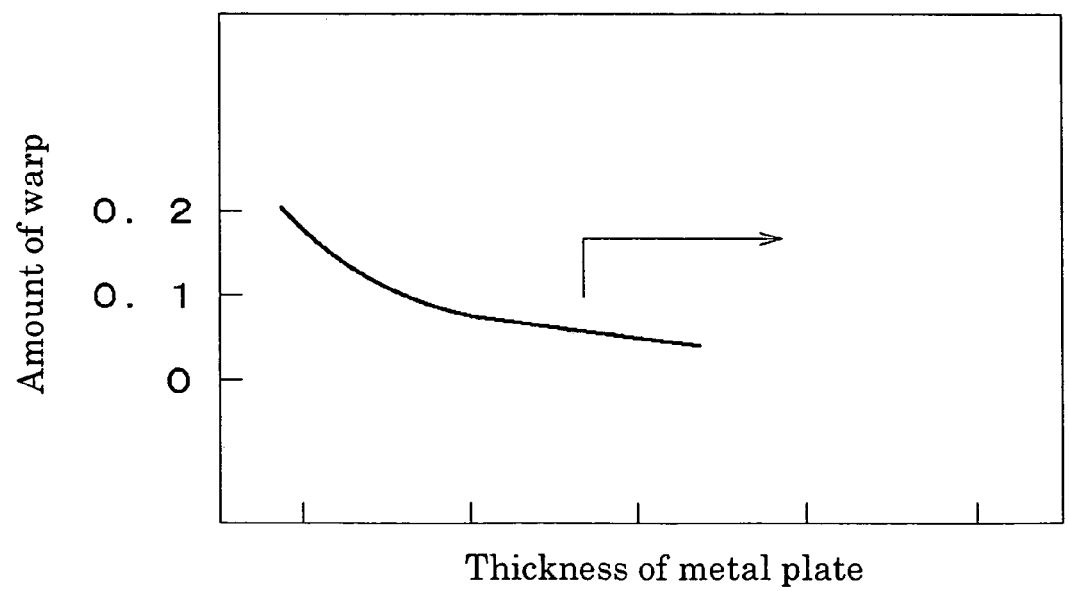

FIG. 11A to FIG. 11B describe the warp of an elastic body that serves as a substrate.

Figure 12:
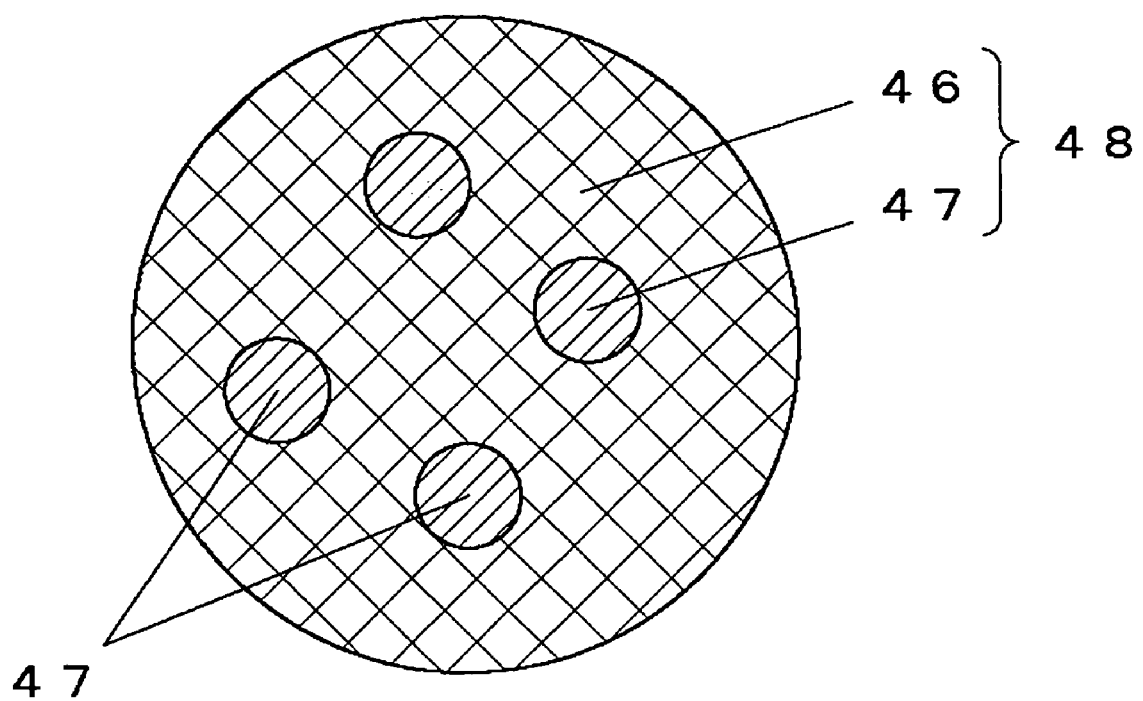

FIG. 12 is an enlarged schematic sectional view of composite glass.

Figure 13A:
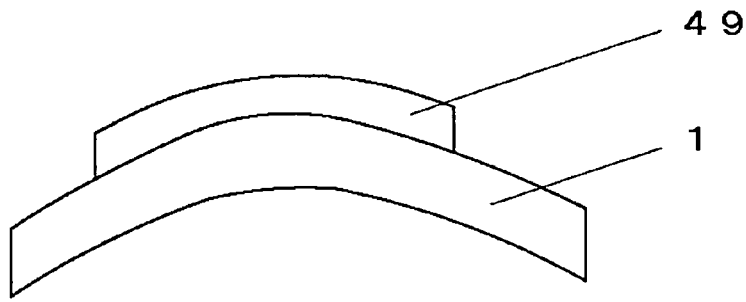
Figure 13B:
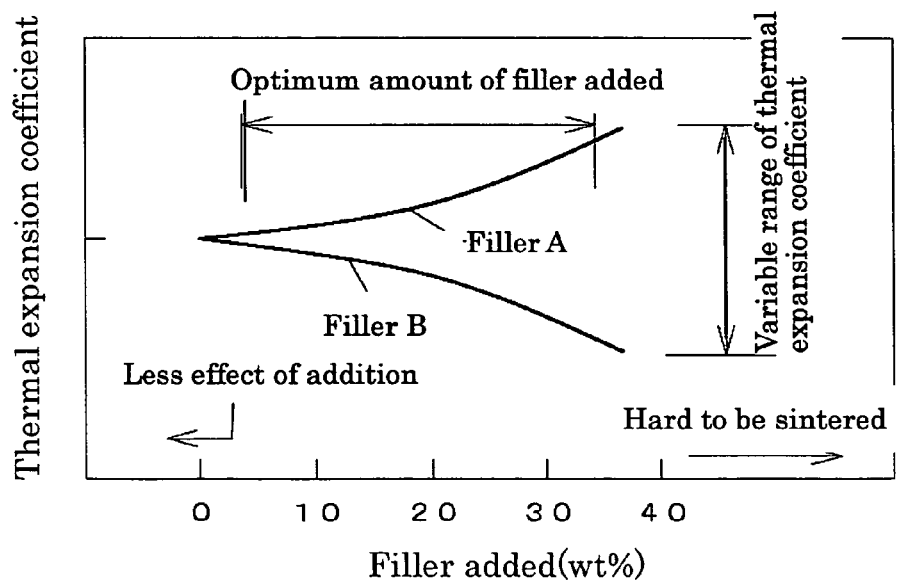

FIG. 13A to FIG. 13B describe the variation of thermal expansion coefficient of composite glass.

Figure 14:
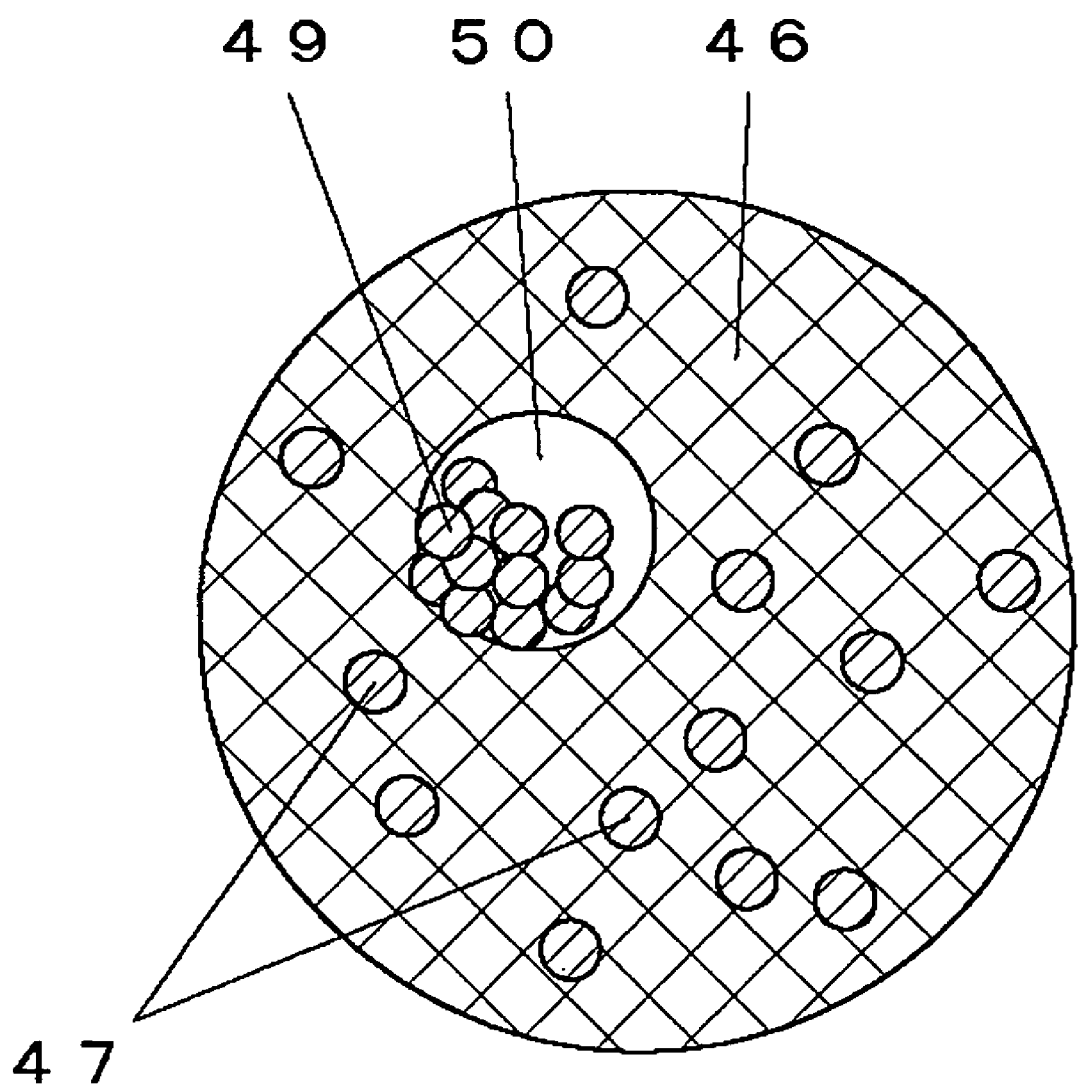

FIG. 14 explains about the problem of composite glass.

Figure 15A:
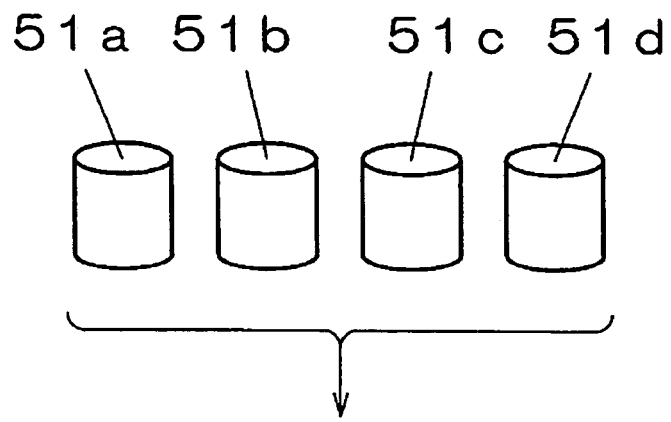
Figure 15B:
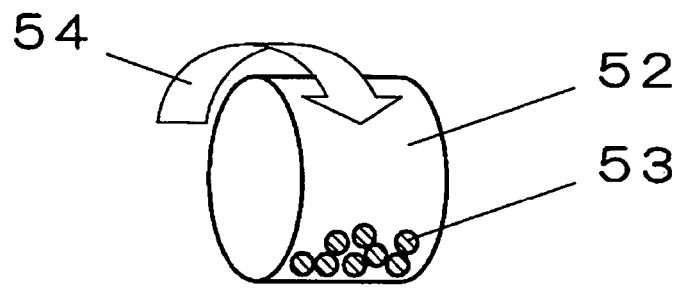
Figure 15C:
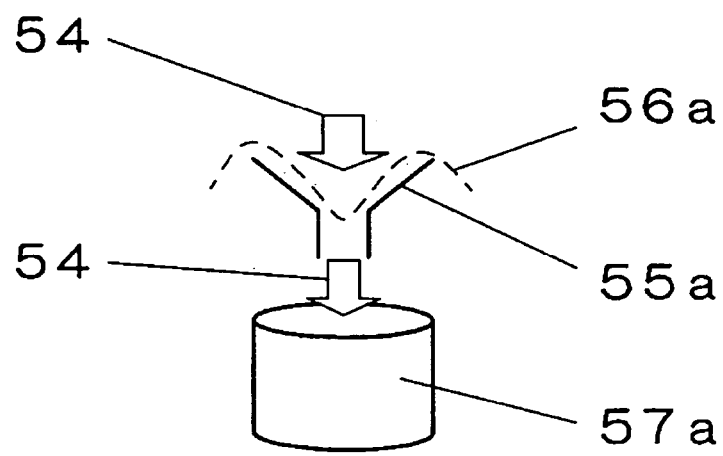

FIG. 15A to FIG. 15C describe the method of manufacturing composite glass paste.

FIG. 16A to FIG. 16D describe the method of manufacturing composite glass paste.

Figure 17:
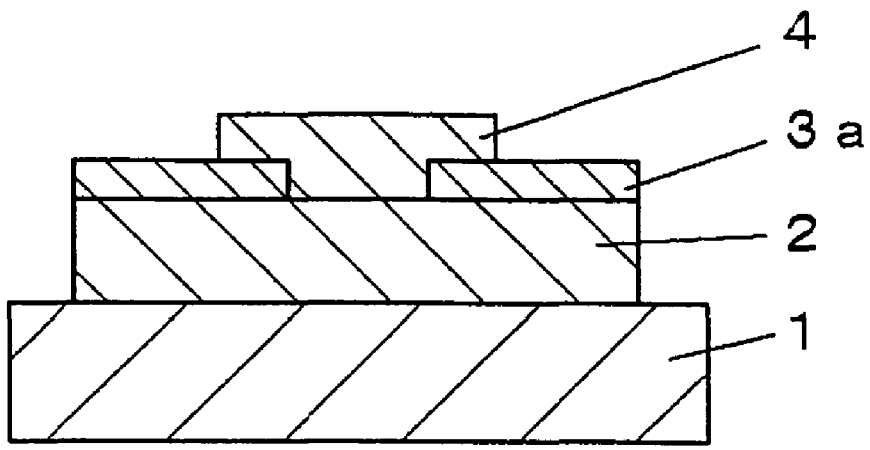

FIG. 17 is a sectional view showing the structure of a conventional load sensor.

Figure 18:
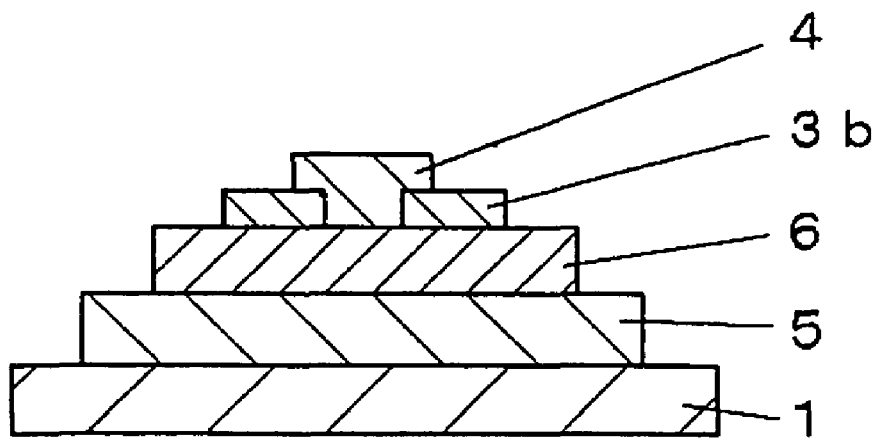

FIG. 18 shows how to form an interface layer.

Figure 19:
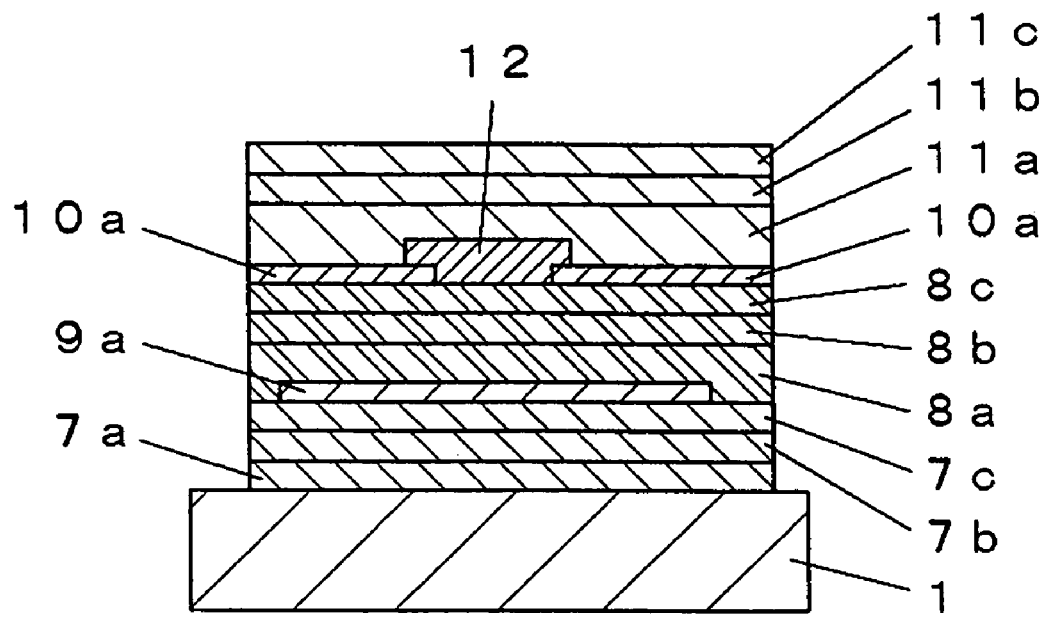

FIG. 19 is a sectional view of an example of load sensor with wiring multi-layered.

Figure 20:
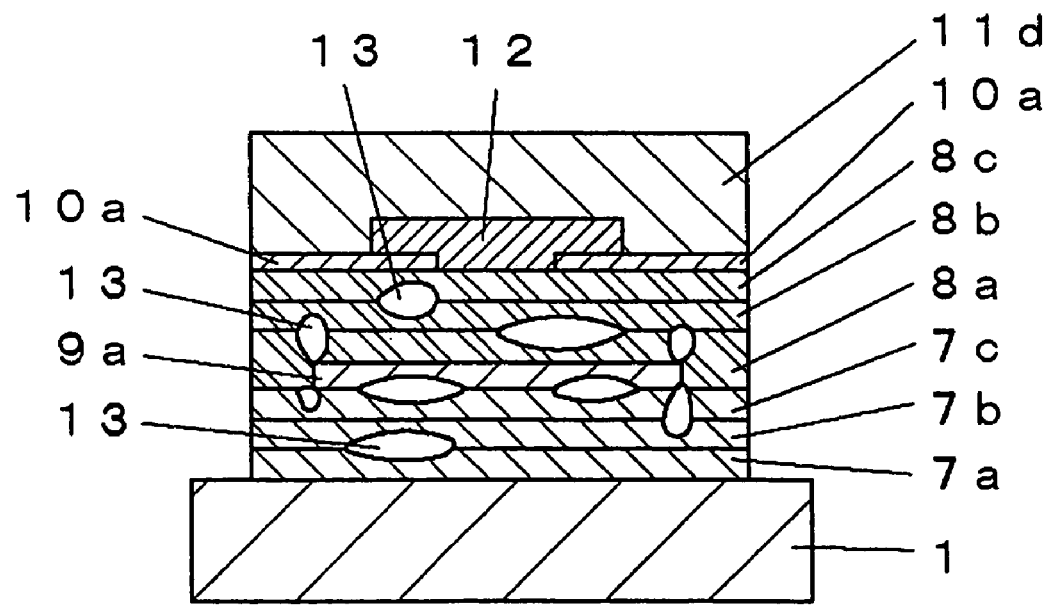

FIG. 20 explains about the problem of forming multiple layers.

DETAILED DESCRIPTION OF THE PREFERRED EMBODIMENTS (Preferred Embodiment 1)

Figure 1:
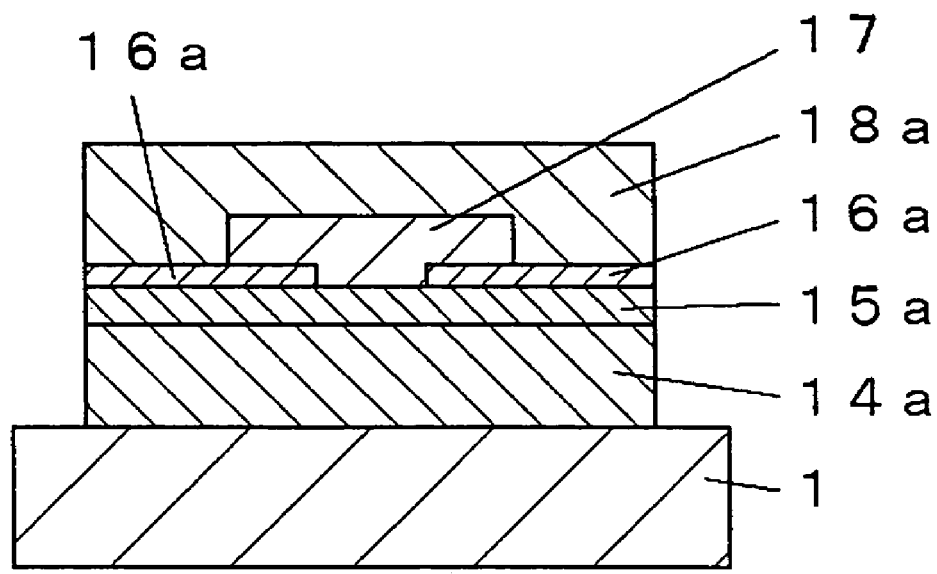
FIG. 1 is a sectional view of a load sensor with single-layered wiring.
Figure 2:
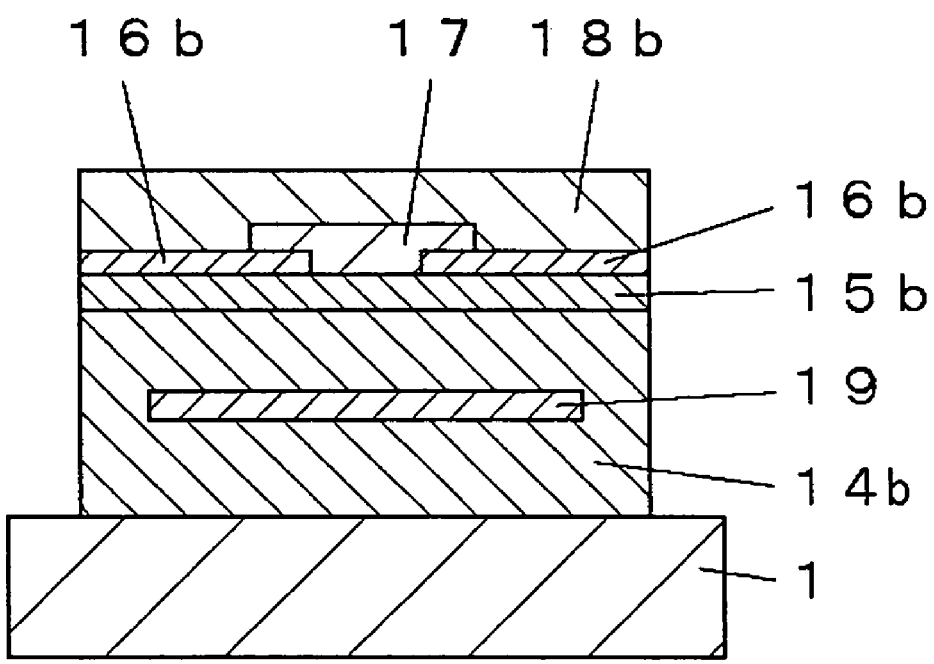
FIG. 2 is a sectional view of a load sensor with multi-layered wiring.

A load sensor with multi-layer wiring will be described with reference to FIG. 1 and FIG. 2. FIG. 1 is a sectional view of a load sensor with single-layer wiring. FIG. 2 is a sectional view of a load sensor with multi-layer wiring. In FIG. 1, crystallized glass 14a is formed on elastic metal body 1, on which wiring 16a and strain sensitive resistor 17 are formed via non-crystalline glass 15a, and protective layer 18a is formed in such manner that at least the strain sensitive resistor 17 is buried therein.

Also, in FIG. 2, crystallized glass 14b with internal electrode 19 built therein is formed on the elastic metal body 1, on which wiring 16b and strain sensitive resistor 17 are further formed via non-crystalline glass 15b, and protective layer 18b is formed in such manner that at least the strain sensitive resistor 17 is buried therein.

Incidentally, FIG. 2 is different from FIG. 2 in such point that the internal electrode 19 is built into the crystallized glass.

As shown in FIG. 2, in the present invention, the internal electrode 19 can be buried in the crystallized glass 14b in accordance with the design item and specification, and EMI (electromagnetic characteristics or noise resistance) of the load sensor can be improved, and further it is possible to prevent cracking due to re-melting of glass layers when the internal electrode is buried or the wiring and strain sensitive resistor are burnt.

Also, as shown in FIG. 1, since the non-crystalline glass 15a is sandwiched between the crystallized glass 14a and strain sensitive resistor 17, the mutual intervention between the crystallized glass 14a and the strain sensitive resistor 17 can be prevented.

FIG. 3A to FIG. 3L are sectional views for describing how to manufacture a load sensor of the present invention. First, as a preparatory step, with reference to Japanese Laid-open Patent H6-137805, specified glass material is mixed and melted in a platinum pot, which is quenched and milled in a ball mill in order to make specified crystallized glass powder. Subsequently, resin (ethyl cellulose) dissolved in solvent (α terpineol) is added to the crystallized glass powder, which is kneaded by using three ceramic rolls, making it into a paste as crystallized glass paste.

Figure 3:
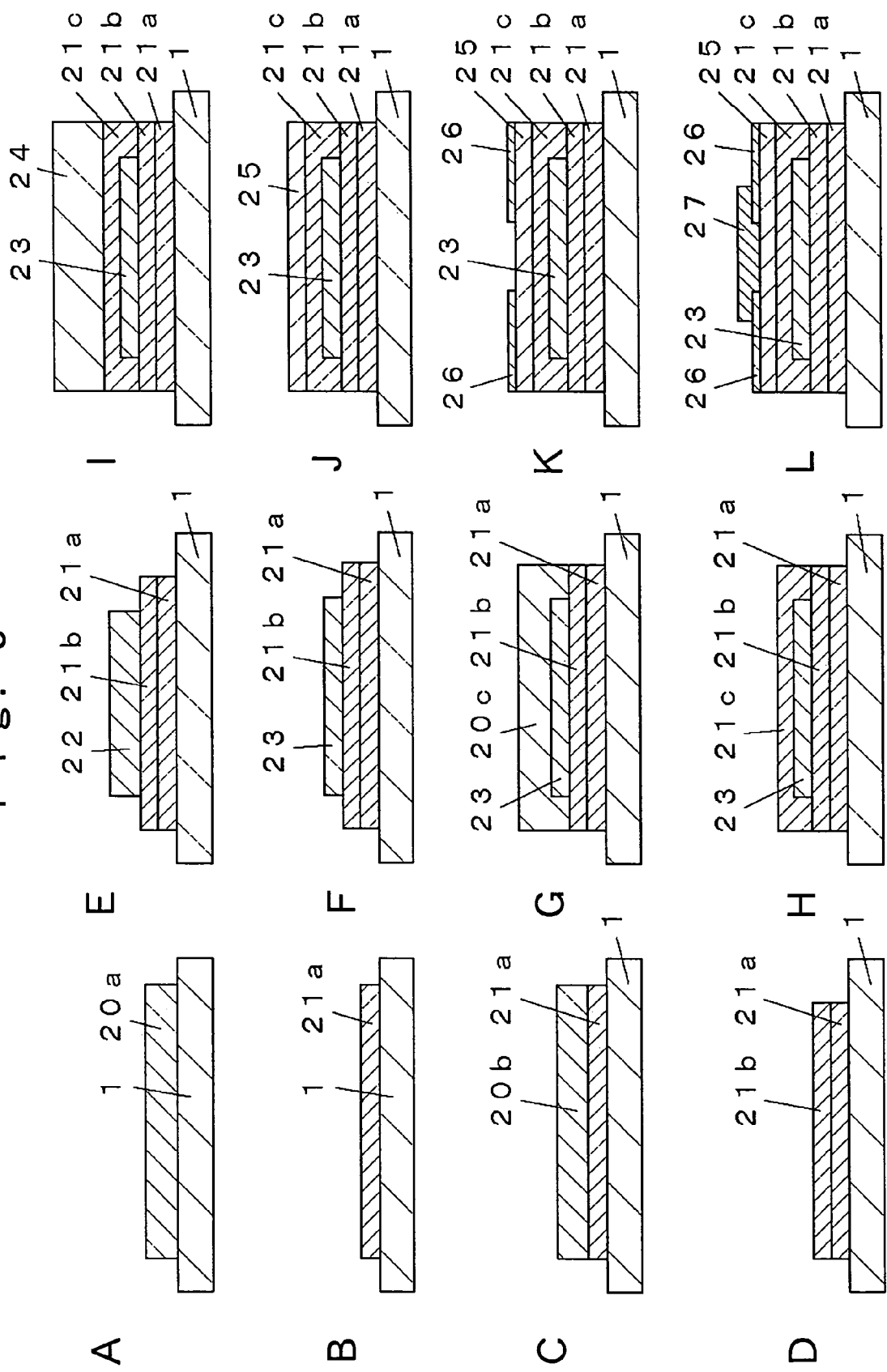
FIG. 3A to FIG. 3L are sectional views showing how to manufacture a load sensor.

First, as shown in FIG. 3A, crystallized glass 20a is printed in predetermined pattern on the elastic metal body 1. And, it is dried and burnt at 850° C., and as shown in FIG. 3B, a first layer of crystallized glass 21a is formed on the elastic metal body 1. Subsequently, as shown in FIG. 3C, crystallized glass paste 20b is printed in predetermined shape on the crystallized glass 21a. It is then dried and burnt at 850° C., and as shown in FIG. 3D, crystallized glass 21a, 21b is formed on the elastic metal body 1. In this way, printing and burning of a crystallized glass layer are repeated to make a plurality of layers, and thereby, it is possible to prevent the generation of dust, bubbles in the paste or pinholes or the like which are liable to be generated during printing.

Next, as shown in FIG. 3E, electrode paste 22 is printed in predetermined pattern on the crystallized glass 21a, 21b. It is then dried and burnt, and as shown in FIG. 3F, internal electrode 23 is formed on the crystallized glass 21a, 21b.

After that, as shown in FIG. 3G, crystallized glass paste 20c is printed in predetermined pattern so as to cover the internal electrode 23, which is dried and further burnt at 850° C., thereby forming crystallized glass layer 21c as shown in FIG. 3H.

Next, as shown in FIG. 3I, non-crystalline glass paste 24 is printed in predetermined pattern on the crystallized glass layer 21c, which is dried and burnt to form non-crystalline glass 25 as shown in FIG. 3J. Subsequently, wiring paste (not shown) is printed in predetermined shape on the non-crystalline glass 25, which is dried and burnt at 850° C. to form wiring 26 as shown in FIG. 3K. Next, resistor paste (not shown) is printed in predetermined shape between the wiring 26, which is burnt at 850° C. to form strain sensitive resistor 27 as shown in FIG. 3L.

And, protective paste (not shown) is printed on the strain sensitive resistor 27, which is repeatedly dried and burnt by a plurality of times, thereby making a load sensor as shown in FIG. 2.

The evaluation of the characteristics of a load sensor thus manufactured has made it clear that the desired characteristics are satisfied with respect to all of strain sensitivity, temperature characteristics, reliability, noise resistance (EMI), and electrostatic resistance (ESD) and that the standards for sensors to be mounted on cars are satisfied.

Also, there are two glass layers between the elastic metal body 1 and the internal electrode 23, and between the wiring 26, the strain sensitive resistor 27 and the internal electrode 23, which are particularly free from defective insulation, and it is not needed to make each of the glass layer into three layers.

For the purpose of comparison, the wiring of a load sensor was formed in multiple layers by using only non-crystalline glass paste as conventional example 1. First, glass paste based on borosilicate lead ($B_2O_3$—$SiO_w$-PbO) proposed in Japanese Laid-open Patent H9-243472 and Japanese Laid-open Patent 2003-97997 was used to make structures as shown in FIG. 1 and FIG. 2.

The steps (printing-drying-burning) shown in FIG. 3A to FIG. 3C are repeated three times to form three layers of non-crystalline glass on the elastic metal body 1. Subsequently, as shown in FIG. 3E to FIG. 3F, internal electrode 23 is formed, and further, the steps (printing-drying-burning) shown in FIG. 3G to FIG. 3J are repeated three times to form three layers of non-crystalline glass on the internal electrode. And, wiring and strain sensitive resistor are formed through the steps of FIG. 3K and FIG. 3L, and finally, three protective layers are formed.

When only non-crystalline glass is used to form multiple layers, the evaluation of the characteristics of the load sensor has made it clear that there are no problems with respect to strain sensitivity, temperature characteristics, reliability, noise resistance (EMI), and electrostatic resistance (ESD), and that the standards for sensors to be mounted on cars are satisfied. Also, no defective insulation is generated between the elastic metal body 1 and internal electrode 23, and between the wiring 26, strain sensitive resistor 27 and internal electrode 23 probably because each of the glass layers is formed in three layers. However, as compared with the preferred embodiment 1, the cost is higher because of the greater number of glass layers, printing and burning times.

Accordingly, using the same process as in FIG. 1 for the purpose of a test, two glass layers were respectively formed between the elastic metal body 1 and internal electrode 23, and between the wiring 26, strain sensitive resistor 27 and internal electrode 23. However, when two glass layers were respectively formed by using such non-crystalline glass, it was not good enough to be put into practical use because of frequent occurrence of defective insulation. Also, as another test, the glass layers were increased in thickness to about 40 µm, then internal cracking was observed. In the case of conventional non-crystalline glass as described above, if the number of layers is reduced by all means, there will remain problems to be solved.

For the purpose of comparison, the wiring of a load sensor was formed in multiple layers by using only crystallized glass paste as conventional example 2. The conventional example 2, using only crystalline glass, will be described.

As crystallized glass of the conventional example, the inventor et al prepared a crystallized glass paste based on the crystallized glass composition proposed in Japanese Laid-open Patent H6-137805. First, with reference to Japanese Laid-open Patent H6-137805, specified glass materials are mixed, and melted in a platinum pot, which is then quenched and milled in a bowl mill to make predetermined crystallized glass powder.

Next, resin (ethyl cellulose) dissolved in solvent (α terpineol) is added to the crystallized glass powder, which is kneaded by using three ceramic rolls, making it into a paste as conventional crystallized glass paste. And, the steps of FIG. 3A to FIG. 3H are executed. Then, in the steps of FIG. 3I to FIG. 3J, crystallized glass paste is used instead of non-crystalline glass. And, a protective layer is finally formed through the steps of FIG. 3K to FIG. 3L. In this way, the sample of conventional example 2 is manufactured. The measurement of the characteristics of conventional example 2 has made it clear that the specified sensitivity as a load sensor is not obtained and also it is considerable in variation of the resistance value and is not good enough to be put into practical use as a load sensor. This is probably because the glass layer formed under the strain sensitive resistor is crystalline glass.

Accordingly, with reference to Japanese Laid-open Patent H6-137805, a metal alkoxide layer was formed on the crystallized glass layer. However, the specification required for a load sensor to be mounted on a car was not sufficiently satisfied because of poor strength and layer quality. Thus, by using crystalline glass, it is possible to obtain high yield even when the glass layers are respectively formed in two layers between the elastic metal body 1 and internal electrode 23, and between the wiring 26, strain sensitive resistor 27 and internal electrode 23, but it is difficult to ensure matching between the strain sensitive resistor and resistor as is confirmed.

For the purpose of comparison, as conventional example 3, the composition proposed in Japanese Patent 3010166 (U.S. Pat. No. 5,898,359) has been examined. First, commercially available glass paste is printed on an elastic metal body of 2 mm thick, and is burnt at 850° C. to make it equivalent to crystalline glass 10a of FIG. 1. And lead-alumina-borosilicate glass is formed thereon as a glass matrix, in which an interface layer containing 15 to 35% of particle alumina and 3 to 6% of particle zinc oxide is formed at a position corresponding to non-crystalline glass 11a. As to conventional example 3 thus prepared, the characteristic as a load sensor was measured, but the expected characteristic was not obtained. This is probably because a resistor material was not employed as proposed in Japanese Patent 3010166.

Also, as to the structure of example 3, when an internal electrode was formed, there sometimes arose a problem as shown in FIG. 19. That is, it has been found that there are limitations on forming multiple layers of wiring in using the material of conventional example 3.

It is said that the thickness of crystallized glass is desirable to be 10 to 200 μm. In case the thickness of crystallized glass is less than 10 μm, there is a possibility of generation of defective insulation. Also, if the thickness of crystallized glass exceeds 200 μm, the cost of glass material will be increased and it is requested to admit a high cost.

Also, it said that the thickness of non-crystalline glass is desirable to be 5 to 100 μm. In case the thickness of non-crystalline glass is less than 5 μm, pinholes or the like of the non-crystalline glass cause the strain resistor and crystallized glass to come in contact with each other, giving rise to a problem such as variation in resistance value.

Also, the protective layer which covers at least the strain sensitive resistor is desirable to be 200 μm or less in thickness. In case the thickness of the protective layer exceeds 200 μm, the protective layer formed in predetermined pattern will sag or spread at the pattern ends during the forming operation, causing the land for mounting semiconductors and chip parts (connection hole for mounting the parts formed in protective layer 18, in which wiring 26 is exposed) to be collapsed.

Also, the overcoat material formed on the strain resistor is desirable to be a glass layer containing PbO by 60 wt % or over. In the case of glass paste containing PbO by 60 wt % or over, the burning temperature is about 400 to 700° C. that is 150° C. or more lower than 850° C. that is the ordinary burning temperature of strain resistor, and therefore, the strain resistor is hardly affected at the burning temperature of overcoat material. Also, it is possible to use overcoat resin. When resin is used for overcoat, silicone resin or epoxy resin is used, in which glass or ceramic powder is added as a filler by about 5 to 50 wt % as needed, thereby increasing the mechanical strength, and when the load sensor is installed in a car, it is hardly scratched or bruised by a spanner or like tool. In case the amount of filler added is less than 5%, the strength of the resin coat will not be sufficiently increased.

Also, if the filler added exceeds 50 wt %, there arises a problem such that the overcoat becomes brittle. Also, in the case of overcoat using resin, it is desirable to be 10 μm to 200 μm in thickness. Also, the protective layer which covers at least the strain sensitive resistor is desirable to be 200 μm or less in thickness. If the thickness of protective layer exceeds 200 μm, the protective layer formed in predetermined pattern will sag or spread at the pattern ends during the forming operation, causing the land for mounting semiconductors and chip parts (connection hole for mounting the parts formed in protective layer 18, in which wiring 26 is exposed) to be collapsed.

It is also effective to make the overcoat in a plurality of layers. Further, it is possible to make the overcoat 10 μm to 200 μm in thickness with use of a glass or ceramic material and further to form a second overcoat of 10 μm to less than 200 μm in thickness similarly with use of a resin-based material thereon. In this way, the reliability of strain sensitive resistor and wiring can be improved by forming the overcoat in multiple layers with use of glass or resin. Also, glass material containing PbO or commercially available resin material can be used for these members.

(Preferred Embodiment 2) Composition of Non-Crystalline Glass

In the preferred embodiment 2, multi-layer wiring and optimization of non-crystalline glass being able to cope with simultaneous burning with crystalline glass will be described.

First, as shown by composition No. 1 to 5 in Table 5, $SiO_2$ was reduced to shift the composition with respect to CaO, $ZrO_2$, $Al_2O_3$, and $B_2O_3$, but excellent results were not obtained. Accordingly, as shown by composition No. 6 to 10 in Table 5, the amount of $SiO_2$ was adjusted to 45 to 65 wt % to shift the composition with respect to CaO, $ZrO_2$, PbO, $Al_2O_3$, and $B_2O_3$, then excellent results were obtained. On the other hand, as shown by composition No. 11 to 14 in Table 5, when the amount of $SiO_2$ was adjusted to 70 wt % or over, excellent results were no obtained.

TABLE 5

| Composition No. | Composition (weight part) | | | | | Surface roughness | Heat resistance | Matching | Total evaluation |
|---|---|---|---|---|---|---|---|---|---|
| | SiO$_2$ | CaO | ZrO$_2$ | PbO | Al$_2$O$_3$ | | | | |
| 1 | 0 to 10 | 0 to 20 | 0 to 20 | 0 to 20 | 0 to 20 | Δ | ○ | Δ | Δ |
| 2 | 10 to 20 | 0 to 20 | 0 to 20 | 0 to 20 | 0 to 20 | Δ | ○ | Δ | Δ |
| 3 | 20 to 30 | 0 to 20 | 0 to 20 | 0 to 20 | 0 to 20 | Δ | ○ | Δ | Δ |
| 4 | 30 to 40 | 0 to 20 | 0 to 20 | 0 to 20 | 0 to 20 | Δ | ○ | Δ | Δ |
| 5 | 40 | 0 to 20 | 0 to 20 | 0 to 20 | 0 to 20 | Δ | ○ | Δ | ○ |
| 6 | 45 | 0 to 20 | 0 to 20 | 0 to 20 | 0 to 20 | ○ | ○ | ○ | ○ |
| 7 | 50 | 0 to 20 | 0 to 20 | 0 to 20 | 0 to 20 | ○ | ○ | ○ | ○ |
| 8 | 55 | 0 to 20 | 0 to 20 | 0 to 20 | 0 to 20 | ○ | ○ | ○ | ○ |
| 9 | 60 | 0 to 20 | 0 to 20 | 0 to 20 | 0 to 20 | ○ | ○ | ○ | ○ |
| 10 | 65 | 0 to 20 | 0 to 20 | 0 to 20 | 0 to 20 | ○ | ○ | ○ | ○ |
| 11 | 70 | 0 to 10 | 0 to 10 | 0 to 10 | 0 to 10 | ○ | ○ | Δ | ○ |
| 12 | 75 | 0 to 10 | 0 to 10 | 0 to 10 | 0 to 10 | Δ | ○ | Δ | Δ |
| 13 | 80 | 0 to 10 | 0 to 10 | 0 to 10 | 0 to 10 | Δ | ○ | Δ | Δ |
| 14 | 85 | 0 to 10 | 0 to 10 | 0 to 10 | 0 to 10 | Δ | ○ | Δ | Δ |

○: No problem (excellent)
Δ: Some problem (needed to improve)
X: Many problems (difficult to put into practical use)

As shown in Table 6, the minimum rate of SiO$_2$ was adjusted to 40 wt % (equivalent to composition No. 15 to 25) and the maximum rate to 80 wt % (equivalent to composition No. 26 to 36) in order to change the rate of each composition.

TABLE 6

| Composition No. | Composition (weight part) | | | | | Surface roughness | Heat resistance | Matching | Total evaluation |
|---|---|---|---|---|---|---|---|---|---|
| | SiO$_2$ | CaO | ZrO$_2$ | PbO | Al$_2$O$_3$ | | | | |
| 15 | 40 | 0 | 0 to 20 | 0 to 20 | 0 to 20 | Δ | ○ | Δ | Δ |
| 16 | 40 | 5 | 0 to 20 | 0 to 20 | 0 to 20 | Δ | ○ | ○ | ○ |
| 17 | 40 | 10 | 0 to 20 | 0 to 20 | 0 to 20 | Δ | ○ | ○ | ○ |
| 18 | 40 | 15 | 0 to 20 | 0 to 20 | 0 to 20 | Δ | ○ | ○ | ○ |
| 19 | 40 | 20 | 0 to 20 | 0 to 20 | 0 to 20 | Δ | X | X | X |
| 20 | 40 | 25 | 0 to 20 | 0 to 20 | 0 to 20 | Δ | X | X | X |
| 21 | 40 | 10 | 0 | 0 to 20 | 0 to 20 | Δ | ○ | ○ | ○ |
| 22 | 40 | 10 | 5 | 0 to 20 | 0 to 20 | Δ | ○ | ○ | ○ |
| 23 | 40 | 10 | 10 | 0 to 20 | 0 to 20 | Δ | ○ | ○ | ○ |
| 24 | 40 | 10 | 15 | 0 to 20 | 0 to 20 | Δ | ○ | Δ | Δ |
| 25 | 40 | 10 | 20 | 0 to 10 | 0 to 10 | Δ | X | Δ | X |
| 26 | 80 | 0 | 0 to 10 | 0 to 10 | 0 to 10 | Δ | ○ | Δ | Δ |
| 27 | 80 | 5 | 0 to 10 | 0 to 10 | 0 to 10 | Δ | ○ | ○ | ○ |
| 28 | 80 | 10 | 0 to 10 | 0 to 10 | 0 to 10 | Δ | ○ | ○ | ○ |
| 29 | 80 | 15 | 0 to 10 | 0 to 10 | 0 to 10 | Δ | ○ | ○ | ○ |
| 30 | 80 | 20 | 0 to 10 | 0 to 10 | 0 to 10 | Δ | X | X | X |
| 31 | 80 | 25 | 0 to 10 | 0 to 10 | 0 to 10 | Δ | X | X | X |
| 32 | 80 | 5 to 15 | 0 | 0 to 10 | 0 to 10 | Δ | ○ | ○ | ○ |
| 33 | 80 | 5 to 15 | 5 | 0 to 10 | 0 to 10 | Δ | ○ | ○ | ○ |
| 34 | 80 | 5 to 15 | 10 | 0 to 10 | 0 to 10 | Δ | ○ | ○ | ○ |
| 35 | 80 | 5 to 15 | 15 | 0 to 10 | 0 to 10 | Δ | ○ | ○ | ○ |
| 36 | 80 | 5 to 15 | 20 | 0 to 10 | 0 to 10 | Δ | ○ | X | X |

○: No problem (excellent)
Δ: Some problem (needed to improve)
X: Many problems (difficult to put into practical use)

In addition to these, the results of experiments executed on a lot of glass compositions are best when the composition rates are as shown in Table 7. Also, in such experiments, it has been found that the rate of lead oxide contained in non-crystalline glass is closely related to the resistance value and the like because of its mutual diffusion to the strain sensitive resistor. This is because the resistor material used by the inventor et al contained lead oxide, but when a strain sensitive resistor using no lead oxide is invented in future, it will be possible to make PbO zero from Table 7.

From the above results, as non-crystalline glass, as shown in Table 7, it has been found that the optimum compositions are 40 to 80 wt % of SiO$_2$, 1 to 10 wt % of alumina, 5 to 15 wt % of CaO, 3 to 15 wt % of PbO, and 3 to 10 wt % of ZrO$_2$. Also, it has been confirmed that the sintering of glass and matching with electrode material (adhesion, crack prevention in simultaneous burning, etc.) can be improved by adding a proper amount of B$_2$O$_3$.

TABLE 7

| Glass component | Total composition (wt %) |
|---|---|
| SiO$_2$ | 40 to 80 |
| CaO | 5 to 15 |
| PbO | 3 to 15 |
| Al$_2$O$_3$ | 1 to 10 |

Figure 4A:
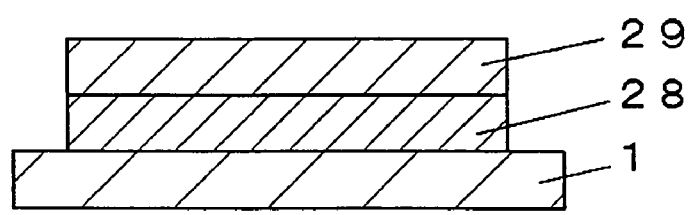
FIG. 4A to FIG. 4C are sectional views showing how to execute simultaneous burning of non-crystalline glass and crystallized glass in the present invention.
Figure 4B:
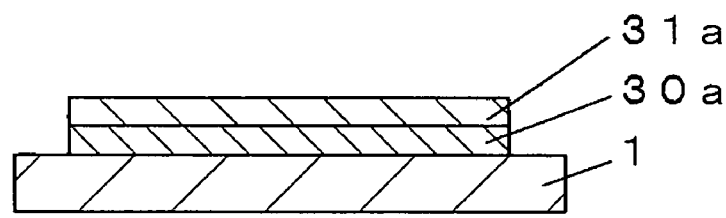
Figure 4C:
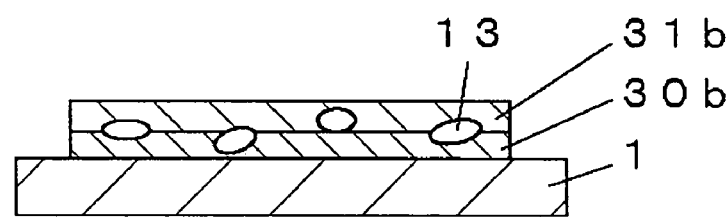

FIG. 4A to FIG. 4C are sectional views showing how to execute simultaneous burning of non-crystalline glass thus prepared and conventional crystallized glass in combination.

As shown in FIG. 4A, conventional crystallized glass paste 28 and non-crystalline glass paste 29 used in the preferred embodiment 2 were formed in multiple layers, which were simultaneously burnt in a mesh belt furnace at 850° C. (total burning time: one hour), and then, as shown in FIG. 4B, crystalline glass 30a and non-crystalline glass 31a were obtained, and no abnormality was generated in the internal structure.

For the purpose of comparison, as a conventional example of non-crystalline glass, borsilicate lead-based ($B_2O_3$—$SiO_2$—PbO) glass proposed in Japanese Laid-open Patent H9-243472 and Japanese Laid-open Patent 2003-97997 and conventional crystallized glass were subjected to a simultaneous burning test.

As shown in FIG. 4A, commercially available crystallized glass 29 was printed on metal substrate 1, and borosilicate lead-based ($B_2O_3$—SiOw-PbO) proposed in Japanese Laid-open Patent H9-243472 and Japanese Laid-open Patent 2003-97997 was printed thereon, and these were simultaneously burnt at 850° C., and the cross-sections were observed to obtain the results as shown in FIG. 4C.

As shown in FIG. 4C, crack 13 is liable to be generated at the boundary between the non-crystalline glass 30b and the crystalline glass 31b, and in the non-crystalline glass 31b. Thus, in the case of conventional non-crystalline glass, it has been found that it is difficult to execute simultaneous burning of non-crystalline glass.

On the other hand, non-crystalline glass proposed in the present invention was combined with commercially available crystallized glass to make a load sensor, and the bearing force was measured by means of an original car collision impact tester, finding that the bearing force is as desired. Particularly, it has been found that the bearing force of the load sensor itself is more improved by using crystalline glass for adhesion to elastic metal body as compared with the case of using only non-crystalline glass. This is probably because crystallized glass is higher in strength than non-crystalline glass, and even in case of cracking, it is hard to spread unlike the one in non-crystalline glass.

The work temperature or softening point of non-crystalline glass is desirable to be 500° C. or over. In case of lower than 500° C., when the strain sensitive resistor is burnt at high temperatures such as 850° C., it may cause the characteristics to be varied due to reaction with the strain sensitive resistor. Also, the work temperature of non-crystalline glass is desirable to be 700 to 900° C. In the case of non-crystalline glass whose work temperature is lower than 700° C., when the strain sensitive resistor is burnt at high temperatures such as 850° C., it may cause the characteristics to be varied due to reaction with the strain sensitive resistor. Also, in the case of non-crystalline glass whose work temperature exceeds 900° C., it is necessary to use expensive material with excellent heat resistance as the elastic metal body.

(Preferred Embodiment 3) Optimization of Crystalline Glass

In the preferred embodiment 3, crystallized glass that can be simultaneously burnt is optimized also in combination with commercially available non-crystalline glass (for example, borosilicate lead-based $B_2O_3$—$SiO_2$—PbO).

Table 8 is an example of optimization of crystalline glass composition. Table 8 shows the compositions with the rate of MgO shifted. As a result, it has been found that the rate is desirable to be 30 to 55 wt % because the rate of MgO is mutually related with crystallinity. As shown in Table 9, Table 10 and Table 11, optimization has been executed with respect to $SiO_2$, $B_2O_3$, BaO, $ZrO_2$, and $Al_2O_3$.

Consequently, it has been found that sintering property is improved by the addition of $SiO_2$ and $B_2O_3$ and that the characteristic is improved by the addition of a specific amount of alumina. Also, the amount of CaO added is desirable to be 0 to 6 wt %. The surface roughens with increase in the amount of CaO added, and it may cause the generation of defects in the screen printing process of other paste. Also, although it is not shown in the above tables, the result obtained in the examination of $SnO_2$ is that the amount added is desirable to be 0 to 5 wt %.

As described above, as crystalline glass, 30 to 55 wt % of MgO, 1 to 30 wt % of alumina, 10 to 25 wt % of $SiO_2$, 5 to 25 wt % of BaO, 5 to 30 wt % of $B_2O_3$, 0 to 6 wt % of CaO, 0 to 5 wt % of $ZrO_2$ and $SnO_2$ are desirable. Also, as the other elements, it is possible to include 0.1 to 5 wt % of $ZrO_2$ and $SnO_2$.

As to PbO and ZnO, if the amount mixed in as impurities during the process of handling the initial material, powder or ink is extremely slight, it will cause no hindrance in the practical use, but containing none of them is best and ideal. Some diffusion of an element in the burning process causes no hindrance in the practical use, but if such element is contained by 0.1 wt % or over in glass, it will cause bad influence to the reliability. For example, because PbO and ZnO are water-soluble, it can be predicted that the reliability will be lowered.

A load sensor was manufactured by using crystalline glass thus optimized, and the bearing force was measured by means of an original car collision impact tester to find that the bearing force is sufficient for practical use. However, when a strain sensitive resistor is directly formed on the crystalline glass, the characteristics (temperature characteristic, stability of resistance value, etc.) of the resistor are sometimes affected.

TABLE 8

| Composition No. | Composition (weight part) | | | | | | Surface roughness | Heat resistance | Matching | Total evaluation |
| --- | --- | --- | --- | --- | --- | --- | --- | --- | --- | --- |
| | MgO | $SiO_2$ | $B_2O_3$ | BaO | $ZrO_2$ | $Al_2O_3$ | | | | |
| 1 | 0 | 0 to 20 | 0 to 20 | 0 to 5 | 0 to 5 | 10 to 30 | ◯ | X | Δ | X |
| 2 | 5 | 0 to 20 | 0 to 20 | 0 to 5 | 0 to 5 | 10 to 30 | ◯ | X | Δ | X |
| 3 | 10 | 0 to 20 | 0 to 20 | 0 to 5 | 0 to 5 | 10 to 30 | ◯ | X | Δ | X |
| 4 | 15 | 0 to 20 | 0 to 20 | 0 to 5 | 0 to 5 | 10 to 30 | ◯ | X | Δ | X |
| 5 | 20 | 0 to 20 | 0 to 20 | 0 to 5 | 0 to 5 | 10 to 30 | ◯ | X | Δ | X |
| 6 | 25 | 0 to 20 | 0 to 20 | 0 to 5 | 0 to 5 | 10 to 30 | ◯ | X | Δ | X |
| 7 | 30 | 0 to 20 | 0 to 20 | 0 to 5 | 0 to 5 | 10 to 30 | ◯ | X | Δ | Δ |
| 8 | 35 | 0 to 20 | 0 to 20 | 0 to 5 | 0 to 5 | 10 to 30 | ◯ | ◯ | Δ | ◯ |
| 9 | 40 | 0 to 20 | 0 to 20 | 0 to 5 | 0 to 5 | 10 to 30 | ◯ | ◯ | ◯ | ◯ |

TABLE 8-continued

| Composition | Composition (weight part) | | | | | | Surface | Heat | | Total |
|---|---|---|---|---|---|---|---|---|---|---|
| No. | MgO | SiO$_2$ | B$_2$O$_3$ | BaO | ZrO$_2$ | Al$_2$O$_3$ | roughness | resistance | Matching | evaluation |
| 10 | 45 | 0 to 20 | 0 to 20 | 0 to 5 | 0 to 5 | 10 to 30 | ○ | ○ | ○ | ○ |
| 11 | 50 | 0 to 20 | 0 to 20 | 0 to 5 | 0 to 5 | 10 to 30 | ○ | ○ | ○ | ○ |
| 12 | 55 | 0 to 20 | 0 to 20 | 0 to 5 | 0 to 5 | 10 to 30 | ○ | ○ | ○ | ○ |
| 13 | 60 | 0 to 20 | 0 to 20 | 0 to 5 | 0 to 5 | 10 to 30 | ○ | ○ | ○ | ○ |
| 14 | 65 | 0 to 20 | 0 to 20 | 0 to 5 | 0 to 5 | 10 to 30 | ○ | ○ | Δ | ○ |
| 15 | 70 | 0 to 20 | 0 to 20 | 0 to 5 | 0 to 5 | 10 to 30 | X | ○ | X | Δ |
| 16 | 74 | 0 to 20 | 0 to 20 | 0 to 5 | 0 to 5 | 10 to 30 | X | ○ | X | X |
| 17 | 80 | 0 to 20 | 0 to 20 | 0 to 5 | 0 to 5 | 10 to 30 | X | ○ | X | X |
| 18 | 85 | 0 to 20 | 0 to 20 | 0 to 5 | 0 to 5 | 10 to 30 | X | ○ | X | X |

○: No problem (excellent)
Δ: Some problem (needed to improve)
X: Many problems (difficult to put into practical use)

TABLE 9

| Composition | Composition (weight part) | | | | | | Surface | Heat | | Total |
|---|---|---|---|---|---|---|---|---|---|---|
| No. | MgO | SiO$_2$ | B$_2$O$_3$ | BaO | ZrO$_2$ | Al$_2$O$_3$ | roughness | resistance | Matching | evaluation |
| 19 | 30 | 0 | 0 to 20 | 0 to 5 | 0 to 5 | 10 to 30 | ○ | Δ | X | X |
| 20 | 30 | 5 | 0 to 20 | 0 to 5 | 0 to 5 | 10 to 30 | ○ | Δ | X | X |
| 21 | 30 | 10 | 0 to 20 | 0 to 5 | 0 to 5 | 10 to 30 | ○ | Δ | ○ | ○ |
| 22 | 30 | 15 | 0 to 20 | 0 to 5 | 0 to 5 | 10 to 30 | ○ | Δ | ○ | ○ |
| 23 | 30 | 20 | 0 to 20 | 0 to 5 | 0 to 5 | 10 to 30 | ○ | Δ | ○ | ○ |
| 24 | 30 | 25 | 0 to 20 | 0 to 5 | 0 to 5 | 10 to 30 | ○ | Δ | ○ | ○ |
| 25 | 30 | 30 | 0 to 20 | 0 to 5 | 0 to 5 | 10 to 30 | ○ | Δ | Δ | X |
| 26 | 30 | 35 | 0 to 20 | 0 to 5 | 0 to 5 | 10 to 30 | ○ | Δ | X | X |
| 27 | 55 | 0 | 0 to 20 | 0 to 5 | 0 to 5 | 10 to 30 | ○ | Δ | X | X |
| 28 | 55 | 5 | 0 to 20 | 0 to 5 | 0 to 5 | 10 to 30 | ○ | Δ | X | X |
| 29 | 55 | 10 | 0 to 20 | 0 to 5 | 0 to 5 | 10 to 30 | ○ | Δ | ○ | ○ |
| 30 | 55 | 15 | 0 to 20 | 0 to 5 | 0 to 5 | 10 to 30 | ○ | Δ | ○ | ○ |
| 31 | 55 | 20 | 0 to 20 | 0 to 5 | 0 to 5 | 10 to 30 | ○ | Δ | ○ | ○ |
| 32 | 55 | 25 | 0 to 20 | 0 to 5 | 0 to 5 | 10 to 30 | ○ | Δ | ○ | ○ |
| 33 | 55 | 30 | 0 to 20 | 0 to 5 | 0 to 5 | 10 to 30 | ○ | Δ | Δ | X |
| 34 | 55 | 35 | 0 to 20 | 0 to 5 | 0 to 5 | 10 to 30 | Δ | Δ | X | X |

○: No problem (excellent)
Δ: Some problem (needed to improve)
X: Many problems (difficult to put into practical use)

TABLE 10

| Composition | Composition (weight part) | | | | | | Surface | Heat | | Total |
|---|---|---|---|---|---|---|---|---|---|---|
| No. | MgO | SiO$_2$ | B$_2$O$_3$ | BaO | ZrO$_2$ | Al$_2$O$_3$ | roughness | resistance | Matching | evaluation |
| 35 | 35 to 55 | 10 to 25 | 0 | 0 to 5 | 0 to 5 | 0 to 5 | ○ | Δ | X | X |
| 36 | 35 to 55 | 10 to 25 | 5 | 0 to 5 | 0 to 5 | 0 to 5 | ○ | ○ | ○ | ○ |
| 37 | 35 to 55 | 10 to 25 | 10 | 0 to 5 | 0 to 5 | 0 to 5 | ○ | ○ | ○ | ○ |
| 38 | 35 to 55 | 10 to 25 | 15 | 0 to 5 | 0 to 5 | 0 to 5 | ○ | ○ | ○ | ○ |
| 39 | 35 to 55 | 10 to 25 | 20 | 0 to 5 | 0 to 5 | 0 to 5 | ○ | ○ | ○ | ○ |
| 40 | 35 to 55 | 10 to 25 | 25 | 0 to 5 | 0 to 5 | 0 to 5 | ○ | ○ | ○ | ○ |
| 41 | 35 to 55 | 10 to 25 | 30 | 0 to 5 | 0 to 5 | 0 to 5 | ○ | Δ | ○ | ○ |
| 42 | 35 to 55 | 10 to 25 | 35 | 0 to 5 | 0 to 5 | 0 to 5 | ○ | Δ | Δ | X |
| 43 | 35 to 55 | 10 to 25 | 40 | 0 to 5 | 0 to 5 | 0 to 5 | ○ | Δ | X | X |
| 44 | 35 to 55 | 10 to 25 | 0 | 0 to 5 | 0 to 5 | 0 to 5 | ○ | Δ | X | X |
| 45 | 35 to 55 | 10 to 25 | 5 to 30 | 0 | 0 to 5 | 0 to 5 | ○ | Δ | X | X |
| 46 | 35 to 55 | 10 to 25 | 5 to 30 | 5 | 0 to 5 | 0 to 5 | ○ | ○ | ○ | ○ |
| 47 | 35 to 55 | 10 to 25 | 5 to 30 | 10 | 0 to 5 | 0 to 5 | ○ | ○ | ○ | ○ |
| 48 | 35 to 55 | 10 to 25 | 5 to 30 | 15 | 0 to 5 | 0 to 5 | ○ | ○ | ○ | ○ |
| 49 | 35 to 55 | 10 to 25 | 5 to 30 | 20 | 0 to 5 | 0 to 5 | ○ | ○ | ○ | ○ |
| 50 | 35 to 55 | 10 to 25 | 5 to 30 | 25 | 0 to 5 | 0 to 5 | ○ | Δ | ○ | ○ |
| 51 | 35 to 55 | 10 to 25 | 5 to 30 | 30 | 0 to 5 | 0 to 5 | ○ | Δ | X | X |
| 52 | 35 to 55 | 10 to 25 | 5 to 30 | 35 | 0 to 5 | 0 to 5 | ○ | Δ | X | X |

○: No problem (excellent)
Δ: Some problem (needed to improve)
X: Many problems (difficult to put into practical use)

TABLE 11

| Composition No. | Composition (weight part) | | | | | | Surface roughness | Heat resistance | Matching | Total evaluation |
| --- | --- | --- | --- | --- | --- | --- | --- | --- | --- | --- |
| | MgO | SiO$_2$ | B$_2$O$_3$ | BaO | ZrO$_2$ | Al$_2$O$_3$ | | | | |
| 53 | 35 to 55 | 10 to 25 | 5 to 30 | 5 to 25 | 0 | 0 to 5 | ○ | Δ | X | Δ |
| 54 | 35 to 55 | 10 to 25 | 5 to 30 | 5 to 25 | 5 | 0 to 5 | ○ | ○ | ○ | ○ |
| 55 | 35 to 55 | 10 to 25 | 5 to 30 | 5 to 25 | 10 | 0 to 5 | ○ | ○ | ○ | ○ |
| 56 | 35 to 55 | 10 to 25 | 5 to 30 | 5 to 25 | 0 to 5 | 0 | Δ | ○ | Δ | Δ |
| 57 | 35 to 55 | 10 to 25 | 5 to 30 | 0 to 5 | 0 to 5 | 1 | ○ | ○ | ○ | ○ |
| 58 | 35 to 55 | 10 to 25 | 5 to 30 | 0 to 5 | 0 to 5 | 5 | ○ | ○ | ○ | ○ |
| 59 | 35 to 55 | 10 to 25 | 5 to 30 | 0 to 5 | 0 to 5 | 10 | ○ | ○ | ○ | ○ |
| 60 | 35 to 55 | 10 to 25 | 5 to 30 | 0 to 5 | 0 to 5 | 15 | ○ | ○ | ○ | ○ |
| 61 | 35 to 55 | 10 to 25 | 5 to 30 | 0 to 5 | 0 to 5 | 20 | ○ | ○ | ○ | ○ |
| 62 | 35 to 55 | 10 to 25 | 5 to 30 | 0 to 5 | 0 to 5 | 25 | ○ | ○ | ○ | ○ |
| 63 | 35 to 55 | 10 to 25 | 5 to 30 | 0 to 5 | 0 to 5 | 30 | ○ | ○ | ○ | ○ |
| 64 | 35 to 55 | 10 to 25 | 5 to 30 | 0 to 5 | 0 to 5 | 35 | ○ | ○ | ○ | ○ |
| 65 | 35 to 55 | 10 to 25 | 5 to 30 | 0 to 5 | 0 to 5 | 40 | Δ | X | Δ | X |

○: No problem (excellent)
Δ: Some problem (needed to improve)
X: Many problems (difficult to put into practical use)

In this case, as shown in FIG. 1 and FIG. 2, the electric characteristics of the load sensor can be stabilized by forming non-crystalline glass on the crystallized glass. The reason why the crystallized glass of the present invention is higher in bearing force as compared with a load sensor manufactured by using only ordinary non-crystalline glass is probably that even in case of internal cracking, such cracking is discontinued at the boundary of the crystallized glass.

As described above, in the case of crystallized glass in the preferred embodiment 3, matching with non-crystalline glass is excellent, simultaneous burning with commercially available non-crystalline glass is possible, and the cost reduction of the load sensor is also possible.

Also, crystallized glass thus obtained in the form of paste, as a conventional non-crystalline glass, and borosilicate lead-based (B$_2$O$_3$—SiOw-PbO) glass proposed in Japanese Laid-open Patent H9-243472 and Japanese Laid-open Patent 2003-97997 were selected in order to execute simultaneous burning tests. As shown in FIG. 4A to FIG. 4C, there were printed on an elastic metal body in specified shape, and commercially available non-crystalline glass paste was printed thereon, which were simultaneously burnt. As shown in FIG. 4B, the non-crystalline glass and crystalline glass were free from generation of abnormality.

For the purpose of comparison, as a conventional example of crystallized glass, the crystallized glass proposed in Table 1 was selected, and similarly, as shown in FIG. 4A to FIG. 4C, simultaneous burning tests were performed. First, as shown in FIG. 4A, the conventional example of crystallized glass was printed on a metal substrate, on which commercially available non-crystalline glass paste was printed, and these were simultaneously burnt at 850° C. in order to observe the cross-sections as shown in FIG. 4C. It has been found that it is difficult to simultaneously burn the crystalline glass and non-crystalline glass because of cracking.

Even when there is no generation of crack 15, in the case of the conventional non-crystalline glass, the performance as a highly durable load sensor for a car is not practical. One of the reasons for this is probably that as compared with the conventional crystallized glass (for example, Table 1), the glass contains alumina by more than a specific amount, while the rates of BaO and B$_2$O$_3$ are rather lower.

Also, it has been found that the crystalline glass proposed in the preferred embodiment 3, as described later, is easy to be sintered together with ceramic powder and changed into composite glass.

(Preferred Embodiment 4) Printing Lamination (Hardening)

In the preferred embodiment 4, simultaneous burning for lowering the burning cost of multiple glass layers printed will be described. As described in the preferred embodiment 1, when multiple glass layers are formed, repeating the printing, drying and burning for each layer, the burning frequency is increased with increase in the number layers, resulting in cost-up of the product. However, when multiple glass layers are formed, repeating the printing and drying, simultaneous burning after forming multiple glass layers causes the smoothness of the layers to worsen, giving rise to the occurrence of problems such as pinholes and uneven thickness of the multiple glass layers printed.

Accordingly, in the preferred embodiment 4, a method of solving such problems by employing hardening paste as the crystallized glass paste will be described.

First, for the purpose of comparison, as a conventional example, pinholes and uneven thickness liable to be generated when crystalline glass paste is multi-layered are described by using FIG. 5. FIG. 5A to FIG. 5E are sectional views for describing how to print crystalline glass paste in multiple layers on an elastic metal body.

Figure 5A:
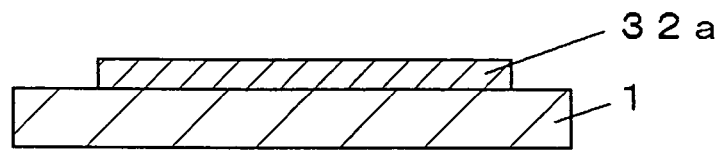
FIG. 5A to FIG. 5E are sectional views showing how to execute multi-layer printing of crystalline glass paste on an elastic metal body.

First, as shown in FIG. 5A, crystallized glass paste 32a printed on elastic metal body 1 is subjected to leveling (surface smoothing) after lapse of a specific time. This is because the solvent component contained in the crystallized glass paste 32a does not soak into the elastic metal body 1.

Figure 5B:
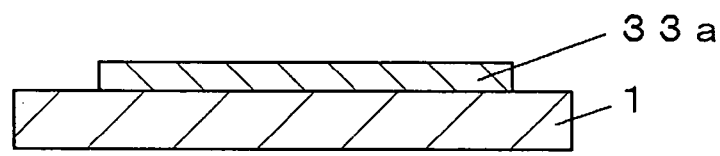
Figure 5C:
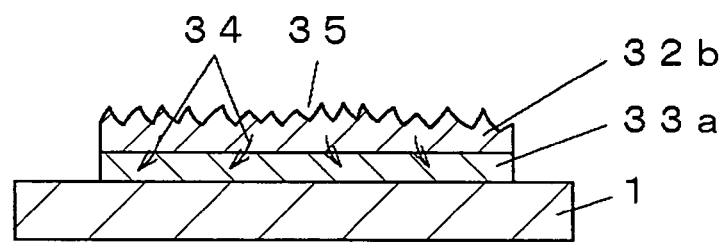
Figure 5D:
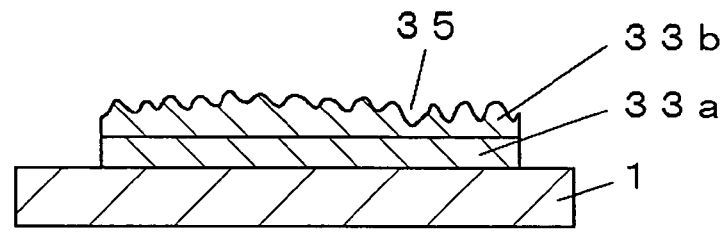

In FIG. 5B, crystalline glass dry layer 33a is formed with the solvent volatilized and dried after leveling of the crystalline glass paste 32a. FIG. 5C shows how to print the crystallized glass paste 32a on the crystalline glass dry layer 33a.

Arrow 34 shows how the solvent component contained in the crystalline glass paste 32b soaks into the crystalline glass dry layer 33a that becomes a surface. And as the solvent component soaks into the surface, the solvent component contained in the crystalline glass paste 32b is gone, increasing the viscosity of crystalline glass paste 32b and lowering the fluidity of the paste, which causes surface irregularities 35 and pinholes (not shown) to be generated. Consequently, as shown in FIG. 5C, there remain surface irregularities 35 of the crystalline glass dry layer 33b. Such irregularities 35 cannot be eliminated by burning. This is because crystalline glass in burning is less in fluidity as compared with non-crystalline glass.

Figure 5E:
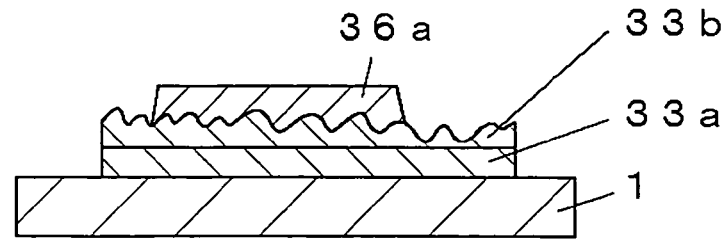

Consequently, as shown in FIG. 5E, when internal electrode 36a is further formed thereon, defective insulation became liable to take place between the internal electrode 36a and the elastic metal body 1.

Therefore, in order to solve such problems, the inventor et al repeated various experiments. As a result, as shown in FIG. 5C, it has been found that it is mainly because the solvent in the paste soaks into the surface. Accordingly, hardening type glass paste has been developed.

FIG. 6A to FIG. 6E show how multiple layers are formed by using hardening type glass paste developed by the inventor et al, which are sectional views for describing how to form multiple layers by printing glass layers on a metal substrate with use of the hardening type glass paste of the present invention.

Figure 6A:
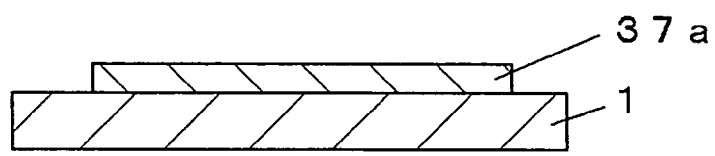
FIG. 6A to FIG. 6E show how to execute multi-layer printing with use of hardening type glass paste.

FIG. 6A shows hardening type glass paste 37a printed by screen printing or the like on the metal substrate 1. In this condition, the paste is immediately subjected to leveling because the solvent in the hardening type glass paste 37a does not soak into the metal substrate 1.

Figure 6B:

After that, the hardening type glass paste 37a is hardened or made insoluble by means of heat, light, electron beam or the like in order to form hardened glass paste 38a shown in FIG. 6B. The surface of the hardened glass paste 38a has been sufficiently leveled, and further, the solvent hardly soaks into the hardened glass paste.

Figure 6C:
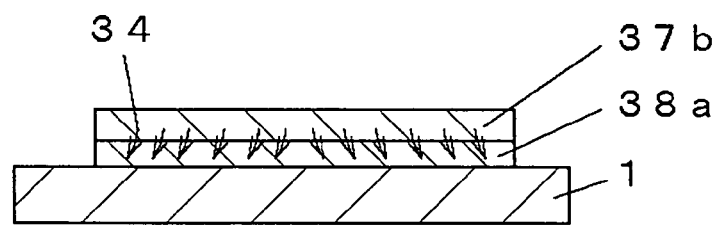
Figure 6D:
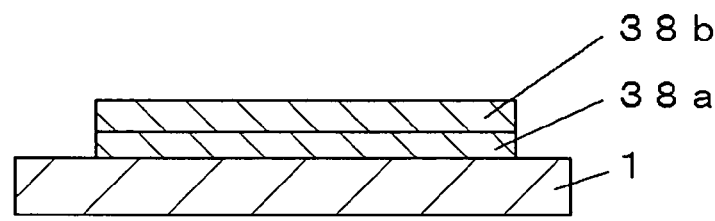

Next, as shown in FIG. 6C, hardening type glass paste 37b is printed for further forming a glass layer as the second layer. In FIG. 6C, since the hardened glass paste 38a has been already hardened, the solvent in the hardening type glass paste 37b printed thereon is unable to soak therein as shown by the arrow 34. Accordingly, the hardening type glass paste 38b is immediately subjected to leveling without allowing the generation of irregularities 35, uneven thickness, or pinholes as shown in FIG. 5C.

The hardening type glass paste 37b thus leveled is hardened, and as shown in FIG. 6C, the surface of the hardened glass paste 38b forming a glass layer as the second layer also becomes a smooth surface free of irregularities, uneven thickness, pinholes or the like.

Figure 6E:
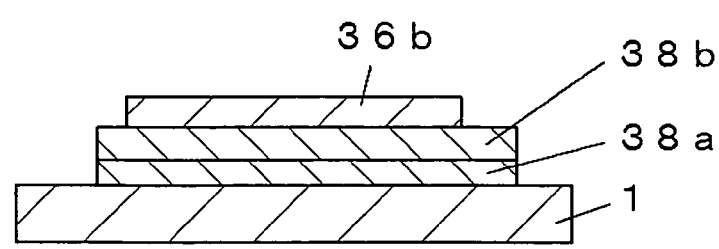

Consequently, as shown in FIG. 6E, even when internal electrode 36b is formed, defective insulation hardly takes place between the internal electrode 36b and the elastic metal body 1. In this way, when multiple layers are formed by using hardening type glass paste, the generation of defects such as irregularities, uneven thickness, pinholes or the like of the glass layers before burning can be suppressed, and it is possible to increase the yield of the load sensor and to lower the manufacturing cost.

On the other hand, in the case of conventional glass paste, the solvent component in the paste soaks into the surface, and its viscosity rapidly increase immediately after printing, resulting in failure of leveling and consequently causing the surface to become considerably irregular. Such irregularities, in the case of screen printing, are more liable to be generated when the screen mesh is rougher.

Accordingly, even when it is intended to make the glass layer thicker by roughening the screen mesh, such irregularities are liable to be generated even with the layer thickness increased, sometimes resulting in lowering of the product yield. Therefore, multiple layers have been printed by using finer mesh (irregularities are less generated with finer mesh) than a conventional one, but since the layer is thinner when the mesh used is finer, it is necessary to increase the printing frequency in order to obtain the required layer thickness, resulting in increase of man-hour.

FIG. 7 describes how such leveling is executed. In FIG. 7, the X axis is time (minutes) after printing, which corresponds to FIG. 5C, FIG. 5D, FIG. 6C and FIG. 6D. Also, the Y axis of FIG. 7 is the result of measurement of surface irregularities (see FIG. 5C, FIG. 5D) on the paste surface immediately after printing until leveling by means of a non-contact laser surface roughness meter. In FIG. 7, mark a (X-marked) is hardening type glass paste prepared by using crystallized glass powder, showing the execution of leveling with the irregularities reduced immediately after printing. Also, in FIG. 7, mark c (○-marked) is hardening type glass paste prepared by using non-crystalline glass powder, showing the execution of leveling with the irregularities reduced immediately after printing. On the other hand, in FIG. 7, mark b (●-marked) is conventional solvent drying type glass paste, showing that the irregularities are hardly reduced after printing.

In the preferred embodiment 4, the crystallized glass paste used is hardening type. Since the non-crystalline glass paste, internal electrode paste, and wiring paste used are hardening type paste, it is possible to greatly improve the leveling property in printing multiple layers and to realize the cost reduction of the load sensor and the yield enhancement. In the preparation of such hardening type paste, it is possible to use non-crystalline glass powder and crystallized glass conventionally proposed, and it can be easily applied to non-crystalline glass and crystalline glass proposed in the present invention, or composite glass described later.

(Preferred Embodiment 5) Content of Hardening Type Insulating Paste

Next, members used for hardening type paste will be described in detail. First, as glass powder used for hardening type glass paste, the average grain diameter is most desirable to be 0.1 to 10 μm. Glass powder with average grain diameter of less than 0.1 μm is very expensive. Also, glass powder with average grain diameter exceeding 10 μm may contain glass powder with grain diameter as large as 20 to 30 μm. Also, glass powder contained in hardening type glass paste is desirable to be in a range of 60 to 80 wt %. In case of less than 60 wt %, when burnt after hardening, the finished glass may become porous (internal cavities are generated) or the layer may excessively shrink during burning, causing the generation cracks when a plurality of layers are simultaneously burnt. Also, when glass powder of 80 wt % or over is contained in the glass paste, the fluidic component (resin or solvent) in the paste is reduced, causing the fluidity of the paste to be lowered, and leveling is sometimes hard to be obtained. Also, the resin content in the hardening type glass paste is desirable to be 1 to 20 wt %. In case the resin is less than 1 wt %, the hardened layer is poor in strength, and it may cause peeling or removing when multiple layers are printed. Also, in case the resin content exceeds 20 wt %, there is no problem of paste hardening, but when the paste is burnt after hardening, the resin component is too much decomposed, and for example, a great deal of smoke is produced in the burning furnace and at the same time the layer may become abnormally swelled or cracked. Also, the amount of solvent in the paste is desirable to be 10 to 40 wt %. In case the amount of solvent is less than 10 wt %, the viscosity of ink becomes higher, and it may affect the continuous printing property or leveling property. Also, in case the amount of solvent is over 40 wt %, the ink drying time becomes longer. In hardening type paste, using no solvent is possible, but it is desirable to contain 10 wt % or over of solvent. In case of using no solvent at all, it is necessary to add a great deal of resin for lowering the paste viscosity to a level required for screen printing, and such resin may cause the generation of cracks or the like during burning. As a solvent added to hardening type ink, it is desirable to use those with boiling point of 150° C. or over. If a solvents with boiling point of lower than 150° C. is used, the drying speed is too fast on the printing machine, which may sometimes affect the continuous printing performance and the ink stability on the machine.

For the preparation of such hardening type paste, hardening type resin is selected as a binder component (resin component) for the ink. As hardening type resin, commercially available are ultra-violet (UV), electron beam (EB), and thermosetting resin. In the case of the present invention, it is necessary to select hardening type resin that is less in ash content because the paste is burnt. Also, even in case there remains some ash (for example, about 1%), such ash is oxide in many cases, and in the case of the present invention, it is a part of the glass component and hardly affects the quality.

Resin component contained in hardening type glass paste is desirable to be 1 to 20 wt %. In case the resin component is less than 1 wt %, the physical strength of the layer hardened (before burning in particular) will be sometimes lowered. When the strength of such layer after hardening is low and the next glass paste or the like is printed thereon by screen printing or the like, the layer may become peeled or scratched, causing the product yield to be lowered.

Particularly, by using hardening type resin of 5 to 100 wt % as the resin in the hardening type insulating paste, it is possible to obtain an effect to prevent the permeation of paste solvent during multi-layer printing. In this way, by adding non-hardening type resin into the paste in advance, it is possible to simplify the manufacture of insulating paste and also to avoid hardening of the insulating paste on the screen printing machine which may otherwise become unable to remove later. For example, out of the resin component in the hardening type insulating paste, by using 50% of thermosetting xylene resin and another 50% of ethyl cellulose resin which is soluble in solvents, even if the ink hardens (or begins to harden) on the screen, it can be easily removed by solvent since the ethyl cellulose being soluble in solvents is used. Thus, since no impurities remain on the screen, stable printing (or self-operated printing) can be performed for many hours. As hardening type resin, it is possible to use resin that is hardened by at least any one of the actions such as heat, light, and electron beam applications.

Particularly, taking into account the productivity, it is more desirable to use one-liquid hardening type resin. In the case of two-liquid hardening type resin, the resin begins to harden with a reaction starter added to the resin that is the parent material. However, if such two-liquid type resin is used to prepare the insulating paste, it will become necessary to add and mix the reaction starter in advance, causing the process to be complicated.

On the other hand, in the case of one-liquid hardening type resin, it hardens as described above without addition of any reaction starter and is easier to use as hardening type resin in the present invention. Also, such resin is well dissolved in solvents with high boiling point such as α terpineol, butylcarbitol, and isophorone which are widely employed for screen printing, it is very easy to adjust the viscosity. Also, when the screen is cleaned after printing, it can be easily cleaned by using butyl acetate or the like. As such hardening type resin, expoxy resin and phenol resin are easy to use. For example, phenol resin and expoxy resin can be used. If two-liquid type hardening resin is used for such purpose, the pasting process will become complicated, and further, the pot life of paste after adding a reaction starter will shorten. In the case of one-liquid type hardening resin, addition of a reaction starter is not needed and pasting is easy. For example, since one-liquid type resin represented by xylene phenol formaldehyde resin is easily dissolved in solvents such as α terpineol or isophorone, and butyl acetate, inking is easy and cleaning after screen printing is very simple.

When glass paste or electrode paste is manufactured by using such hardening type resin, the organic solvent added into the paste is desirable to be 150° C. or over in boiling point. In the case of organic solvents with boiling point of lower than 150° C., natural evaporation easily takes place during the printing process, and it causes the generation of pinholes in the printing surface due to change in viscosity of the paste during the operation or it becomes difficult to obtain smooth leveling.

All the resin component in the paste is not always required to be thermosetting resin. Hardening type resin is preferable to be occupying 5 to 100 wt % of the resin contained in the paste. In this way, by adding non-hardening type resin such as ethyl cellulose resin, butyral resin, and acrylic resin in advance, even when the ink becomes hardened or gelled on the screen, it can be easily removed since ethyl cellulose and the like are soluble in solvents.

Also, organic solvents contained in hardening type paste is desirable to be 150° C. or over in boiling point. Thus, when an organic solvent is contained in hardening type paste, it simplifies the viscosity adjustment and solid adjustment of the hardening type paste, thereby stabilizing the manufacturing quality throughout the year. In case of organic solvents with boiling point of lower than 150° C., natural evaporation is easy to take place during the printing process, and therefore, the paste viscosity changes during the operation, sometimes causing variation in thickness of the layer printed. Also, the amount of such organic solvent contained in hardening type paste is desirable to be 10 to 40 wt %. In case the solvent contained in hardening type paste is less than 10 wt %, the solvent viscosity and solid adjusting range will be narrowed. Also, in case the solvent contained is over 40 wt %, the layer will greatly vary in thickness due to drying of the ink.

The viscosity of hardening type paste is desirable to be 10 to 10000 poise (rotating speed in the case of rotary viscometer is in a range of 10 to 100 rpm, or in a range of 1 to 100/s in shear rate) from the viewpoint of printability and leveling property. Such hardening type paste is desirable to have a certain level of thixotropicity (Theological phenomenon—viscosity varies with shear rate). Therefore, the viscosity ratio of the paste (for example, rotating speeds 10 rpm to 50 rpm, or shear rates 1/s to 5/s) or the like is desirable to be 1.0 or over, and more desirable to be 1.2 or over. If the viscosity ratio exceeds 5, the thixotropicity will become too high, resulting in longer time until leveling, and it is rather impractical.

As to the hardening type glass paste prepared this way, as compared with conventional solvent diluted type glass paste that uses resin such as ethyl cellulose, there is no difference in the glass itself after sintering (burning at 800 to 900° C.), but clear difference can be observed with respect to the burning profile. Accordingly, the inventor et al prepared hardening type glass paste using phenol resin and conventional type glass paste using ethyl cellulose resin, by using crystallized glass powder conventionally proposed, and set the specified amounts of these in a platinum pot to execute thermal analysis (called TG/DTA) in a range from room temperature to 900° C. As a result, the features of both appeared in DTA graph (not shown) in particular. In the case of conventional type, an endothermic peak at which the solvent component evaporates was observed at 150 to 200° C.

After that, an exothermic peak at which the ethyl cellulose resin thermally decomposes was observed at about 300° C., and there was no particular change thereafter, and an exothermic peak probably due to crystallization of the glass was observed at around 800° C.

On the other hand, in the case of hardening type, after an endothermic peak at which the solvent component evaporates was observed at 150 to 200° C., a broad peak probably due to heating caused by hardening of the resin was observed at around 300 to 450° C. Finally, an exothermic peak probably at which the hardened resin probably thermally decomposes was observed at 500 to 550° C., and there was no particular change thereafter, and an exothermic peak probably due to crystallization of the glass was observed at around 800° C.

As a result of the above thermal analysis, in the case of hardening type resin, heat resistance increases as the resin is hardened, causing the thermal decomposition temperature of the paste to be increased. Now, by using the glass paste used here, as shown in FIG. 10A, an internal electrode without sintering retardant was buried therein and the paste was burnt together with the internal electrode. Then, in the case of hardening type glass paste, as shown in FIG. 10B, it was possible in some cases to execute simultaneous burning of multiple layers without any particular problems (despite that no sintering retardant is added to the internal electrode).

On the other hand, in the case of conventional type glass paste, as shown in FIG. 10C, various cracks were generated in all cases. From the results of the experimental and the thermal analysis, it has been found that using hardening type resin is effective to prevent cracking in burning and shrinking (probably at about 500° C.) of the internal electrode. That is, in the case of conventional type glass paste, at the shrinking start temperature of the internal electrode, the adhesion of glass powder to each other is low (because the resin component is decomposed and gone), and therefore, the glass layer cracks due to metal shrinking, and it may cause the generation of cracks.

On the other hand, in the case of hardening type glass paste, at the shrinking start temperature of the internal electrode, the adhesion of glass to each other is high (because resin component increased in heat resistance due to hardening still remains), and therefore, it is probably possible to prevent the glass layer from metal shrinking and resultant cracking.

Thus, it is clear that a certain level of sintering retardation can be obtained by using hardening type resin even in the case of conventional glass composition. In this way, using such sintering retardation technique with use of hardening type resin, it enables simultaneous burning of glass and metal, and in addition for example, even in the case of different kinds of glass being different in softening point and transition point, or crystalline glass and non-crystalline glass, it is possible to obtain such effect that simultaneous burning of multiple layers can be easily performed. Thus, when the heat resistance of resin is increased by using hardening type resin in order to prevent cracking from occurrence during sintering, the resin component is burnt down, not remaining on the glass or electrode after burning, and therefore, there is no influence to the characteristics. However, because of using resin (organic), the sintering retardation (or prevention of cracking in simultaneous burning) is only up to around 600° C. at the most, but the crack preventing effect is very remarkable.

Also, by using both of such crack preventing technique with use of organic material and the method of adding a sintering retardant to the electrode described later (crack preventing technique using inorganic material), it is of course possible to prevent cracking and to make easier the simultaneous burning of multiple layers.

Also, the thickness of glass paste after hardening or insolubilizing is desirable to be 12 to 300 μm. In case of less than 12 μm, pinholes may be sometimes generated during printing. Also, in case of less than 12 μm, there is a possibility such that the glass layer after burning becomes thinner being less than 10 μm in thickness, causing the generation of defective insulation. In case the thickness of glass paste exceeds 300 μm, the number of printed layers is increased even when multiple layers are printed while hardening, resulting in cost-up. Also, in case of over 300 μm, the glass layer after burning exceeds 200 μm in thickness, then the thickness and weight of the load sensor are increased, further causing the cost of material for glass to become higher.

(Preferred Embodiment 6)

As the preferred embodiment 6, the method of manufacturing hardening type crystallized glass paste will be described in the following.

First, as crystallized glass, the material shown in Table 8 to Table 11 was weighed in a platinum pot and melted under high temperatures. After that, the melted glass component was thrown into water for rapid cooling. After that, it was milled for a long time by means of a bowl mill. After that, it was classified to prepare glass powder with grain diameter of 10 μm or less. Subsequently, selecting hardening type resin as the vehicle for ink, and using hardening type phenol resin dissolved in a solvent, a specified amount of glass powder was added thereto, and it was kneaded by three ceramic rolls. A water-cooled device was connected to the ceramic roll to prevent resin hardening due to the roll heat during kneading operation by the roll. Also, when one lot corresponds to a slight amount such as about 1 kg, there arises no problem in kneading by three rolls after manual pre-mixing by using a jig such as a spatula in a proper container (even in case some solid matter remains, it can be visually detected on the rolls, and proper measure can be taken by increasing the rolling frequency as needed). However, when one lot is 10 kg or over, manual pre-mixing is physically too much burden, and then it is desirable to use a machine such as a planetary mixer or kneader for the execution of pre-mixing before kneading by three rollers.

A solvent was added as desired to the glass paste thus prepared, and after adjusting the viscosity, it was filtered and completed. For filteration, a commercially available screen type filter with opening of 10 to 20 μm is employed, and the filtering efficiency can be increased by filtering under pressure as needed.

By using hardening type glass paste thus prepared, printing and hardening were repeated for printing multiple layers as shown in FIG. 6A to FIG. 6E, but no particular problems were found. Also, it was burnt, but no particular problems were found. Also, for the purpose of comparison, as conventional ink, the ink was similarly prepared by using ethyl cellulose dissolved in α terpineol in place of hardening type phenol resin as the vehicle. Multiple layers were printed by using the ink, then the results as shown in FIG. 5A to FIG.

5E were obtained. Also, it was burnt to find that defective insulation is liable to be generated between the elastic metal body and internal electrode. Then, the cross-section of a sample with defective insulation was observed to find that, as shown in FIG. 5E, the glass layer is remarkably uneven in thickness and also cavities are generated in the glass already sintered.

The hardening temperature is desirable to be 100° C. or over for 10 sec. or over, and lower than 400° C. for less than 30 minutes. When the hardening temperature is lower than 100° C., there is a possibility that the viscosity of the ink increases during kneading of the ink or with the ink left as it is. When the hardening temperature is 400° C. or over, some of the resin begins to decompose and it is sometimes difficult to improve the printability by adding such resin to hardening type resin. Also, the hardening time is desirable to be within a range of 10 sec. to 30 minutes. Particularly, in the case of resin that begins hardening within 10 sec. at 100° C., there is a possibility that the viscosity changes during kneading of the ink or the pot life shortens.

When the hardening temperature is set to 400° C. or over for 30 minutes or over, there is a possibility that some of the resin added begins to decompose, and if the next glass layer or the like is printed thereon, the leveling property will be lowered.

Also, it is possible to use light for hardening (or insulubilizing). For example, UV (ultraviolet ray) or IR (far-infrared ray) can be used for hardening. Such optical hardening type resin for screen printing is marketed from each maker, for example, as overcoat material for posters. Also, such optical hardening type resin that can be diluted with solvents such as BCA (butyl carbitol acetate) or α terpineol whose boiling point is as high as 150° C. or over is commercially available. Such resin can also be used in the present invention.

Here, with the hardening device set at 400° C., in the case of a load sensor, the temperature sometimes fails to increase smoothly because the elastic metal body is great in heat capacity. In that case, it is preferable to directly heat by using a hot plate or the like.

As crystallized glass to be used for the crystallized glass, other than those mentioned in Table 8 to Table 11 can be used. Particularly, in the case of a load sensor proposed in the present invention, using an elastic metal body, commercially available crystallized glass whose thermal expansion coefficient ranges from about $90 \times 1E-7$/° C. (9 ppm/° C.) to $150 \times 1E-7$/° C. (15 ppm/° C.) may be selected.

In this case, the average grain diameter of glass powder is desirable to be less than 5 μm. In case the average grain diameter is 5 μm or over, there remains sometimes a lump as large as 20 to 30 μm, which may affect the printability. Also, as the paste viscosity, a range of 10 to 10000 poise is desirable. If the viscosity is less than 10 poise, the viscosity is too low and it is hard to make thick layers, and further, there is a possibility that the printed pattern spreads or runs. Also, if the viscosity exceeds 10000 poise, the viscosity is too high and there is a possibility that pinholes are generated. In the case of such paste, the viscosity sometimes greatly varies depending upon the shear rate (or rotating speed) of the viscometer. Therefore, it is desirable to measure the paste viscosity at a shear rate in a range of 1 to 100/s.

(Preferred Embodiment 7)

As the preferred embodiment 7, hardening type paste of non-crystalline glass paste will be described in the following.

First, as non-crystalline glass, the material shown in Table 5 to Table 7 was weighed in a platinum pot and melted under high temperatures. After that, the melted glass component was thrown into water for rapid cooling. After that, it was milled for a long time by means of a bowl mill. After that, it was classified to prepare glass powder with grain diameter of less than 10 μm. Subsequently, selecting hardening type resin as the vehicle for ink, and using hardening type phenol resin dissolved in a solvent, a specified amount of glass powder was added thereto, and it was kneaded by three ceramic rolls. A water-cooled device was connected to the ceramic roll to prevent hardening of the resin due to the roll heat during kneading operation by the roll. Also, when one lot corresponds to a slight amount such as about 1 kg, there arises no problem in kneading by three rolls after manual pre-mixing by using a jig such as a spatula in a proper container. Even in case some solid matter remains, it can be visually detected on the rolls, and proper measure can be taken by increasing the rolling frequency as needed.

However, when one lot is 10 kg or over, manual pre-mixing is physically too much burden, and then it is desirable to use a machine such as a planetary mixer or kneader for the execution of pre-mixing before kneading by three rollers.

A solvent was added as needed to the glass paste thus prepared, and after adjusting the viscosity, it was filtered and completed. For filtration, a commercially available screen type filter with opening of 10 to 20 μm is employed, and the filtering efficiency can be enhanced by filtering under pressures as needed.

By using hardening type glass paste thus prepared, printing and hardening were repeated for printing multiple layers as shown in FIG. 5A to FIG. 5E, but no particular problems were found. Also, it was burnt, but no particular problems were found.

Also, for the purpose of comparison, as conventional ink, the ink was similarly prepared by using ethyl cellulose dissolved in α terpineol in place of hardening type phenol resin as the vehicle. Multiple layers were printed by using the ink, then the results as shown in FIG. 4A to FIG. 4E were obtained. Also, it was burnt to find that defective insulation is liable to be generated between the elastic metal body and internal electrode. Then, the cross-section of a sample with defective insulation was observed to find that, as shown in FIG. 4E, the glass layer is remarkably uneven in thickness and also cavities are generated in the glass already sintered.

The hardening temperature is desirable to be 100° C. or over for 10 sec. or over, and lower than 400° C. for less than 30 minutes. When the hardening temperature is lower than 100° C., there is a possibility that the viscosity of the ink increases during kneading of the ink or with the ink left as it is. When the hardening temperature is 400° C. or over, some of the resin begins to decompose and it is sometimes difficult to improve the printability by adding such resin to hardening type resin. Also, the hardening time is desirable to be within a range of 10 sec. to 30 minutes. Particularly, in the case of resin that begins hardening within 10 sec. at 100° C., the viscosity may vary during kneading of the ink or the pot life may shorten.

Also, when it is necessary to be set to 400° C. or over for 30 minutes or over, there is a possibility that some of the resin added begins to decompose, and if the next glass layer or the like is printed thereon, the leveling property will be lowered.

As the material to be used for crystallized glass, other than those mentioned in Table 5 to Table 7 can be used. Particularly, in the case of a load sensor proposed in the present invention, using an elastic metal body, out of commercially available crystalline glass whose thermal expansion coefficient ranges from about 90×1E−7/° C. to 150×1E−7/° C., it is preferable to select a material of good matching with strain sensitive resistor. The average grain diameter of glass powder is desirable to be less than 5 μm. In case the average grain diameter is 5 μm or over, there remains sometimes a lump as large as 20 to 30 μm, which may affect the printability. Also, as the paste viscosity, a range of 10 to 10000 poise is desirable. If the viscosity is less than 10 poise, the viscosity is too low and it is hard to make thick layers, and further, there is a possibility that the printed pattern spreads or runs. Also, if the viscosity exceeds 10000 poise, the viscosity is too high and there is a possibility that pinholes are generated. In the case of such paste, the viscosity sometimes greatly varies depending upon the shear rate (or rotating speed) of the viscometer. Therefore, it is desirable to measure the paste viscosity at a shear rate in a range of 1 to 100/s.

(Preferred Embodiment 8)

As the preferred embodiment 8, the method of manufacturing hardening type electrode paste will be described in the following.

First, as internal electrode paste, silver-based conductive powder was selected and, using hardening type phenol resin dissolved in a solvent in advance, it was kneaded by three metallic rolls. A water-cooled device was connected to the three rolls to prevent hardening of the resin due to the roll heat during kneading operation by the rolls. Also, when one lot corresponds to a slight amount such as about 1 kg, there arises no problem in kneading by three rolls after manual pre-mixing by using a jig such as a spatula in a proper container. Even in case some solid matter remains, it can be visually detected on the rolls, and proper measure can be taken by increasing the rolling frequency as needed.

However, when one lot is 10 kg or over, manual pre-mixing is physically too much burden, and then it is desirable to use a machine such as a planetary mixer or kneader for the execution of pre-mixing before kneading by three rollers. A solvent was added as needed to the glass paste thus prepared, and after adjusting the viscosity, it was filtered and completed. For filtration, a commercially available screen type filter with opening of 10 to 20 μm is employed, and the filtering efficiency can be enhanced by filtering under pressures as needed.

By using the electrode paste thus prepared, printing and hardening were repeated for printing multiple layers as shown in FIG. 5A to FIG. 5E, but no particular problems were generated. Also, it was burnt, but no particular abnormalities were found. Also, for the purpose of comparison, as conventional ink, the ink was similarly prepared by using ethyl cellulose dissolved in α terpineol in place of hardening type phenol resin as the vehicle. Multiple layers were printed by using the ink, then the results as shown in FIG. 4A to FIG. 4E were obtained. Also, it was burnt to find a lot of irregularities caused due to uneven printing on the glass material printed on the electrode paste.

Defective insulation was liable to take place between the elastic metal body and internal electrode. Then, the cross-section of a sample with defective insulation was observed to find that, as shown in FIG. 4E, the glass layer is remarkably uneven in thickness and also cavities are generated in the glass already sintered.

The hardening temperature is desirable to be 100° C. or over for 10 sec. or over, and lower than 400° C. for less than 30 minutes. When the hardening temperature is lower than 100° C., there is a possibility that the viscosity of the ink increases during kneading of the ink or with the ink left as it is. When the hardening temperature is 400° C. or over, some of the resin begins to decompose and it is sometimes difficult to improve the printability by adding such resin to hardening type resin. Also, the hardening time is desirable to be within a range of 10 sec. to 30 minutes.

Particularly, when resin that begins hardening within 10 sec. at 100° C. is employed, there is a possibility that the viscosity changes during kneading of the ink or the pot life shortens. Also, when the hardening temperature is set to 400° C. or over for 30 minutes or over, there is a possibility that some of the resin added begins to decompose, and if the next glass layer or the like is printed thereon, it may cause the leveling property to be lowered. In the present invention, hardening type paste can be combined with glass paste besides electrode paste.

Next, hardening type resin using hardening type electrode paste will be described. First, one-liquid type hardening resin is desirable as hardening type resin. Ordinary phenol resin or epoxy resin can be used for such application. When the insulating paste is prepared by using two-liquid resin, it is necessary to add and mix a reaction starter just before using. Therefore, in the common manufacturing process, the process becomes complicated, giving rise to the problem of wrong weighing of the reaction starter.

On the other hand, one-liquid hardening resin represented by xylene resin or the like hardens with only heat added without adding any reaction starter, and it is very easy to use as the hardening type resin in the present invention. As hardening type electrode paste, it is desirable to contain 10 to 80 wt % of metal powder. In case metal powder is less than 10 wt %, the required conductivity will not be sometimes obtained.

Also, in case the metal powder is over 80 wt %, it is sometimes unable to obtain sufficient leveling (smoothing) after printing. Also, the resin component contained in the hardening type electrode paste is desirable to be 1 to 20 wt % or less. In case the resin component is less than 1 wt %, the physical strength of unburned insulating layer (after hardening) formed due to hardening is sometimes too low. In case the strength of unburned insulating layer (after hardening) is too low, when printing the next insulating paste thereon by screen printing or the like, the electrode pattern is sometimes cracked, scratched, or recessed in mesh form, resulting in lowering of the product yield.

Also, the organic solvent contained in hardening type electrode paste is desirable to be 150° C. in boiling point. Thus, with organic solvent contained in hardening type insulating paste, it becomes easier to adjust the viscosity of paste and the solid content of paste, thereby enabling the stabilization of the product quality for a long period of time. In case the boiling point of organic solvent is lower than 150° C., it is liable to naturally evaporate during the printing process, and therefore, the paste viscosity changes during the operation, causing the unburned insulating layer (after hardening) to become uneven in thickness.

Also, in the case of such organic solvent, the solvent contained in the paste is desirable to be 10 to 40 wt %. In case the solvent in the paste is less than 10 wt %, the adjustable ranges of viscosity and solid content by solvent are narrowed. Also, in case the solvent contained is over 40 wt %, the variation in thickness of the layer due to drying of the ink becomes greater, and the interior of the electrode may sometimes become porous after drying (or hardening). The viscosity of insulating paste is desirable to be 10 poise to 10000 poise. In case of less than 10 poise, the viscosity of ink is too low, making it difficult to perform screen printing.

Also, if the viscosity of ink exceeds 10000 poise, the viscosity is too high and it is difficult to perform sufficient leveling even with the surface hardened. Using one-liquid hardening type resin by 5 to 100 wt % as the resin in the insulating paste, the insulating paste can be easily manufactured and also the insulating paste will not harden on the screen printing machine, not becoming too stubborn to be removed.

For example, out of the resin component in the hardening insulating paste, by using 50% of thermosetting xylene resin and another 50% of ethyl cellulose resin which is soluble in solvents, even if the ink hardens (or begins to harden) on the screen, it can be easily removed by solvent since the ethyl cellulose being soluble in solvents is used. Thus, no impurities remain on the screen, and stable printing or self-operated printing can be performed for many hours.

The hardening temperature is desirable to be 100° C. or over for 10 sec. or over. In the case of using easy-to-harden resin as the paste, for example, resin that hardens at lower than 100° C. in less than 10 sec., there is a possibility that the pot life of the paste sometimes shortens even if stored in a cold and dark place.

The average grain diameter of metallic powder is desirable to be 0.1 to 10 μm, and such metallic powder based on silver is desirable to be contained in the paste by 60 to 80 wt % or over. Thus, by using inexpensive silver of low resistance value as the electrode, it becomes possible to lower the cost of electronic parts. It is also possible to prevent solder wettability and migration by adding palladium or platinum or in the form of alloy as needed, thereby improving the reliability of electronic parts.

It is also possible to execute simultaneous burning of a plurality of unburned insulating layers together with electrode layer as needed which are formed on a substrate. In the preferred embodiments 1 to 3, the improvement of quality in multiple layer printing was described. However, a plurality of unburned insulating layers thus hardened and formed on a metal substrate can also be simultaneously burned. By simultaneously burning a plurality of unburned insulating layers together with unburned electrode layer, it is possible to reduce the number of burning furnaces and to greatly reduce the manufacturing cost.

Also, the burning temperature is desirable to be 600 to 950° C. (more desirable to be 600 to 900° C.). In case of lower than 600° C., the electric conductivity and the adhesion to the substrate will be sometimes insufficient. Also, when the burning temperature required is higher than 950° C., conductor powder based on inexpensive silver cannot be used as wiring material, and furnter, it is necessary to use expensive and special one (high bearing force, acid resistance, heat resistance) because of the metal substrate itself. Also, it is desirable to execute the burning not in a reduction atmosphere using nitrogen gas, hydrogen gas or the like but in an oxidation atmosphere using air containing common oxygen. Thus, burning in an oxidation atmosphere causes the hardening type resin to become hard to remain as residual carbon in the insulator, and thereby, the reliability of the insulating layer can be improved.

Also, in the case of hardening type electrode paste, it is desirable to contain metallic powder of 0.1 to 10 μm in grain diameter by 60 to 80 wt %, glass powder or ceramic powder by 1 to 10 wt %, resin by 1 to 20 wt %, and solvent of 150° C. or over in boiling point by 10 to 40 wt %. Also, the viscosity is desirable to be 10 to 10000 poise, and hardening resin contained in the resin is desirable to be 5 to 100%.

When the average diameter of metallic powder is less than 0.1 μm, the shrinking start temperature in burning is lowered, and it is sometimes hard to execute simultaneous burning. Also, if it exceeds 10 μm, uneven thickness is liable to be generated and it becomes difficult to form a fine pattern. Also, when the metallic powder added is less than 60 wt %, the resistance value may sometimes become too high. Also, in case of over 80 wt %, the organic component such as solvent become less, and the ink viscosity is liable to vary so much, resulting in difficult handling. The glass powder or ceramic powder is preferable to be organic compound (so-called metal resinate) instead of powder, but when the amount added is less than 1 wt %, it sometimes causes the effect of addition to become lessen and the adhesion to the substrate to be lowered.

Also, in case the amount added exceeds 10 wt %, it sometimes causes the resistance value to be increased. Also, in case the resin is less than 1 wt %, the layer is lowered in strength after hardening of the electrode paste and becomes easy to peel off or to be scratched. Also, in case the resin exceeds 20 wt %, the layer becomes higher in strength but the amount of resin decomposed during burning is increased and it sometimes results in swelling or cracking during burning.

Also, the boiling point of solvent is desirable to be 150° C. or over. If the boiling of solvent is lower than 150° C., the paste will soon dry on the printing machine, affecting the continuous printability. Also, in case the solvent is less than 10 wt %, the paste becomes easy to dry and the ink viscosity is liable to vary.

Also, in case it exceeds 40 wt %, it takes too much time for drying of the ink. Also, in case the viscosity is less than 10 poise, the pattern is liable to spread during printing and it is sometimes difficult to form a highly accurate pattern.

Also, in case the viscosity exceeds 10000 poise, the viscosity is too high and it is difficult to print a fine pattern. Also, in case the rate of hardening type resin in the resin is less than 5 wt %, it sometimes does not harden. Also, in case the rate of hardening type resin is 100%, it will cause no problem to arise, but in that case, the hardening type resin is desirable to be solvent-soluble type resin. By using solvent-soluble type hardening resin, it is possible to increase the solid content (other than volatile component) in the ink and to thicken the layer, and also, the equipment and plate can be cleaned with an organic solvent after the end of printing, thereby ensuring excellent workability. Also, the paste viscosity can be adjusted to the optimum value by regulating the amount of solvent.

The internal electrode thus formed is desirable to be less than 50 μm in thickness. If it exceeds 50 μm, the cost of the electrode will be higher, and the thickness results in creation of a step, causing influences to the step of forming a glass layer, wiring, resistor or the like thereon.

(Preferred Embodiment 9) Internal Electrode Material

In the preferred embodiment 9, the problem that is liable to arise during simultaneous burning of glass and internal electrode is solved by optimizing the composition of internal electrode. First, as internal electrode 5, silver is desirable to be 80 wt % or over, and further, it is desirable to add crystalline glass material or alumina material formed vertically of the internal electrode, as inorganic sintering retardant, by 1 to 20 wt % in total.

For example, in FIG. 2, for internal electrode 19, it is desirable to add glass material comprising crystallized glass 14b which vertically holds the internal electrode 19 or composite glass material into the internal electrode paste in advance. In this way, it is possible to further strengthen the bonding when the internal electrode paste is burned with the crystalline glass. Also, since the thermal expansion coefficient of internal electrode 19 can be approached to that of crystallized glass layer 14b, the concentration of stress can be suppressed even in its simultaneous burning with glass layer, and cracks are hard to be generated.

Next, by using FIG. 8A to FIG. 8C, simultaneous burning of multiple layers of internal electrode and glass will be described. As described in the following, the manufacturing cost can be lowered by burning a plurality of layers.

First, in FIG. 8A, crystalline glass 39a, 39b is formed (already burnt) on elastic metal body 1. Also, on the crystalline glass 39b is printed internal electrode paste 40a in predetermined pattern, on which crystalline glass paste 41a is further printed in the predetermined pattern. Thus, in case of multiple-layer printing, in which hardening type paste is employed, the leveling property can be improved and variation in thickness of the printed layer or pinholes can be reduced.

In the preferred embodiment 9, the simultaneous printing of the internal electrode paste and the crystalline glass paste coated thereon will be described.

In FIG. 8B, crystalline glass 39c and internal electrode 42a correspond to crystalline glass paste 41a and internal electrode paste 40a that have been subjected to simultaneous burning. As shown in FIG. 8B, since sintering retardant is previously added to the internal electrode paste 40a, there arises no particular problems even when the internal electrode paste and the crystallized glass paste coated thereon are simultaneously burnt.

On the other hand, as shown in FIG. 8C, in case no sintering retardant is added to the internal electrode paste 40, crack 43 is liable to be generated in the periphery of internal electrode 42b and in the crystalline glass 39c surrounding the periphery. In FIG. 8C, since the crystalline glass 39a, 39b is previoyusly burnt and crystallized (the melting point is raised to 1000° C. or over due to crystallization), crack 43 is hard to be generated even when the internal electrode 41 is burned at about 850° C.

As sintering retardant, it is possible to use ceramic powder or metal resinate (organic matter).

Also, FIG. 9A to FIG. 9C are sectional views for describing how to burn all together a plurality of layers, internal electrode and crystallized glass that serves as a surface. First, in FIG. 9A, on the elastic metal body 1 is print-laminated a plurality of crystallized glass paste 41b, 41c, on which the internal electrode paste 40b is further printed in predetermined shape. Since sintering retardant is previously added to the internal electrode paste 40b, as described in FIG. 9B showing the cross-section, it causes no hindrance to the internal electrode 42b or the crystallized glass 39c, 39d serving as the surface.

On the other hand, as shown in FIG. 9C, in case no sintering retardant is added to the internal electrode paste 40b, then crack 43 is liable to be generated in the periphery of internal electrode 42b and in the crystallized glass 39c, 39d thereunder. The cause of such cracking is the difference in shrink between metal and glass subjected to burning, and the crack 43 is sometimes generated at the interface of crystallized glass or the interface with the internal electrode.

FIG. 10A to FIG. 10C are sectional views showing how these plurality of layers are burned together in a state of having the internal electrode vertically held by crystallized glass. First, in FIG. 10A, a plurality of crystallized glass pastes 41d, 41e are printed on the elastic metal body 1, and further, internal electrode paste 40c is printed in predetermined shape thereon, which is further covered with crystallized glass paste 41f. Since sintering retardant is previously added to the internal electrode paste 40c, as described in FIG. 10B showing the cross-section, there arises no particular problem even in simultaneous burning of the internal electrode 40c and the crystallized glass pastes 41e, 41f which vertically cover the same.

On the other hand, as shown in FIG. 10C, in case no sintering retardant is added to the internal electrode paste 40c, crack 43 is liable to be generated in the periphery of internal electrode 42c and in the crystallized glass 39f for burying it and its interface. Also, the crack 43 is sometimes generated at the interface of crystallized glass or the interface with the internal electrode.

When ceramic powder or crystallized glass is added as sintering retardant to such electrode paste, if added in the form of powder, it often remains as coagulant agglomerate after sintering, causing the reliability to be lowered. Therefore, when adding ceramic powder, it is desirable to disperse the powder in the form of paste in advance. It is also possible to prevent the generation of cracks in simultaneous burning of a plurality of layers by using hardening type paste as the glass paste and electrode material as shown in FIG. 8 to FIG. 10.

This is because hardening the paste causing the shrink start temperature in burning of the paste after burning to be shifted to the higher temperature side of about 100 to 200° C. as compared with the case of using ordinary resin such as ethyl cellulose. Further, synergistic effect can be expected by adding such sintering retardant to the hardening type paste, and so much the amount of the sintering retardant added is decreased and the electric conductivity is enhanced, and it is possible to lower the cost of electrode material since hardening type resin is far less inexpensive as compared with sintering retardant.

Also, by using such techniques, as shown in FIG. 2, it is of course possible to execute the simultaneous burning of crystallized glass 14b with the internal electrode 19 built in, the simultaneous burning of the internal electrode 19, crystallized glass 19 and non-crystallized glass 15b, and the simultaneous burning of the internal electrode 19, crystallized glass 19, non-crystallized glass 15b and wiring 16b. Also, as described above, the simultaneous burning can be further simplified by using both of the crack preventing technique using hardening type resin and the crack preventing technique using sintering retardant described here.

For the internal electrode, it is desirable to add $Bi_2O_3$ by 1 to 15 wt % according to the design item and specification as needed, which is based on silver. In case the amount of $Bi_2O_3$ added is less than 1 wt %, the adhesion to the glass is sometimes too low. Also, if it exceeds 15 wt %, the resistance value exceeds the specified range or there may arise influences due to diffusion of bismuth to the glass layer. Also, it is desirable to contain $SiO_2$ and $CuO$ by 0.5 to 10 wt %. In case these are less than 0.5 wt %, the adhesion of the glass may be sometimes lowered. Also, if it exceeds 10 wt %, it may cause the resistance value to be increased or influences to be generated due to its diffusion to the glass. Also, such $SiO_2$ and $CuO$ may be expected to bring about the effect of electrode sintering retardation.

(Preferred Embodiment 10)

In the preferred embodiment 10, the wiring material connected to the strain sensitive resistor will be described. With use of wiring connected to the strain sensitive resistor, various semiconductors and chip parts are mounted by soldering, and the product cost can be lowered. Also, such mounting of parts is not executed by the maker, which is often performed by the user. As compared with hybrid IC using ordinary alumina substrate or the like, the load sensor is greater in heat capacity because of using a metallic substrate.

Accordingly, even when solder reflow is previously executed on the load sensor, soldering is more difficult as compared with an ordinary circuit board. Therefore, it takes much time for soldering and there arises a problem of solder leaching of the wiring of the load sensor. Solder leaching is such that the electrode material forming the wiring is melted in the solder, causing the material to become thinner or to be gone. If such solder leaching is generated, there is a possibility that the adhesion and tensile strength of the parts mounted are lowered.

To cope with such problems peculiar to a load sensor, it is desirable to use silver palladium for the electrode material used for wiring. Particularly, with palladium contained by 5% or over, and more desirably, 10% or over, it is possible to prevent the generation of solder leaching under various soldering conditions.

In soldering of the wiring, besides solder leaching, wettability of the wiring material against solder is also an important factor. For improving such wettability against solder, it is desirable to add bismuth oxide to the wiring material. The amount of bismuth oxide added is desirable to be about 1 to 20 wt %, and more desirable to be 5 wt % to 20 wt %. In case the amount of bismuth oxide added is less than 1 wt %, the adding effect may be sometimes obtained.

Also, if it exceeds 20 wt %, the bismuth oxide added will be deposited at the peripheral area of the wiring pattern after burning, resulting in deterioration of the characteristics or sometimes affecting the electrical characteristics of the strain sensitive resistor. Also, the adhesion to the surface can be enhanced by adding 0.5 to 5 wt % of $SiO_2$ and CuO in advance.

Also, it is desirable to use silver palladium as the wiring material for parts mounting portions (or soldering portions), but it is not always required to use silver palladium for the connection to the strain sensitive resistor, and it is preferable to use electrode material based on inexpensive silver that is less in palladium content (for example, 1 wt %). Thus, it is possible to print a material of high palladium content on soldering portions, and an inexpensive wiring material on the other portions, separately carrying out the printing operations.

As proposed in the present invention, especially by using hardening type non-crystalline glass paste, the leveling property of the wiring pattern to be printed thereon can be improved and, therefore, it is possible to make the layer thickness of wiring more uniform.

Also, excellent effects can be obtained especially when different wiring inks are combined for printing. Also, the more the thickness of wiring after printing (before burning) is uniform, the thickness of wiring after burning is more uniform, and therefore, the printability of the strain sensitive resistor to be printed thereon can be improved, and further, the parts mounting (soldering) operation to be executed later can be stabilized.

(Preferred Embodiment 11) Description of Composite Glass (Crystal+Ceramic)

As the next preferred embodiment 11, the method of manufacturing a load sensor will be described by using various kinds of elastic metal bodies. As the use of a load sensor widens, there emerge various market requirements for a load sensor, and in order to meet such needs and requirements, it is necessary to properly use elastic metal bodies of various shapes and materials. For example, the members used are different in various factors such as external dimensions, substrate thickness, machining sizes, thickness and material qualities, and mounting holes provided or not. While using such members, it is necessary to provide a load sensor with multi-layered wiring to the market.

However, in the case of glass material conventionally proposed, since the thermal expansion coefficient is fixed, there still remain problems to be solved.

FIG. 11 describes the warp of elastic metal body that serves as such substrate. FIG. 11A is an example of forming glass layer 44 on the elastic metal body 1. Also, reference numeral 45 is the warp of elastic metal body 1. FIG. 11B shows the relationship between the thickness and warp of the elastic metal body. As compared with FIG. 11B, the amount of warp decreases with increase in thickness of the elastic metal body 1, but there is a possibility that the glass layer 44 breaks or peels when the warp exceeds a specific value. Generally, a load sensor is free from the generation of such problem as shown in FIG. 11B because each glass material is optimized and manufactured with respect to the metallic substrate specifications (such as material, thickness, and shape). However, even in case of using same elastic metal body, if the thickness is changed to 0.2 mm, 1 mm, 2 mm and 5 mm, the purposes cannot be achieved by using same glass material. Besides the reason shown in FIG. 11B, it is also closely related to the difference in machining method or residual amount of machining strain. Even in case of using same elastic metal body, the machining method and procedure for punching 1 mm thickness are greatly different from those for punching 5 mm thickness, and therefore, using a material having single thermal expansion coefficient is not enough to cope with this. As a result, it is necessary to develop numerous glass materials, causing the cost to be increased.

Accordingly, in the preferred embodiment 11, it is intended to make composite the glass materials used for load sensors and to meet such requirements by finely adjusting the thermal expansion coefficient.

FIG. 12 is an enlarged schematic sectional view of composite glass. In FIG. 12, ceramic powder 47 being dispersed in crystallized glass 46 is simultaneously burnt to form composite glass 48.

In this way, the composite glass is formed by simultaneous burning of the glass with ceramic powder being dispersed therein, and the thermal expansion coefficient of the composite glass can be finely adjusted through the fine adjustment of the kind and the amount of the ceramic powder 47 added thereto.

Conventionally, it has been necessary to develop glass materials in accordance with the elastic metal bodies. By making composite the glass material as described above, even when only one kind of glass material is used, it is possible to cope with various elastic metal bodies and to realize the cost reduction of the load sensor. With use of such method, it is possible to make composite non-crystalline glass as well as crystallized glass.

First, as the preferred embodiment 11, a load sensor using a composite glass layer, the feature of the present invention, will be described. In the preferred embodiment 11, composite glass is to be used for crystalline glass layer 14a of FIG. 1 and crystalline glass layer 14b of FIG. 2.

FIG. 13 describes how the thermal expansion coefficient of the composite glass is changed. FIG. 13A is the composite glass 48 formed on the elastic metal body 1. The result of measurement of the thermal expansion coefficient of the composite glass is shown in FIG. 13B. In FIG. 13B, the X axis stands for the amount of filler added to the composite glass layer, and the Y axis is the thermal expansion coefficient of the finished composite glass layer. From FIG. 13B, it is clear that the composite glass formed by adding filler A is more lowered in thermal expansion coefficient with increase in the amount of the filler added. Also, in the case of composite glass with filler B added, it becomes higher in thermal expansion coefficient with increase in the amount of the filler added.

Also, from FIG. 13B, it is clear that when the amount of the filler added is less than 5 wt %, the thermal expansion coefficient is less varied and less in the effect of the filler added. Also, as shown in FIG. 13B, when the amount of the filler added exceeds 40 wt %, the composite glass becomes hard to be sintered and its mechanical strength is sometimes lowered. Thus, since the variable range of thermal expansion coefficient can be widened by adjusting the kind and the amount of the filler added, it is possible to cope with elastic metal bodies having various thermal expansion coefficients even with use of single glass material.

When the thermal expansion coefficient of the crystallized glass of the crystallized glass 46 in FIG. 12 is 8.5 ppm/° C., the thermal expansion coefficient of the finished composite glass can be lowered by adding thereto the ceramic powder 47 comprising alumina of 7 ppm/° C. in thermal expansion coefficient. Also, the thermal expansion coefficient of the finished composite glass can be increased by adding thereto zirconia of 9.5 ppm/° C. in thermal expansion coefficient as the ceramic powder 47 of FIG. 12.

Also, even in case the crystallized glass 47 itself whose thermal expansion coefficient is as large as 10 or 13 ppm/° C., the thermal expansion coefficient can be adjusted by making it composite.

Particularly, selecting the crystallized glass 46 having thermal expansion coefficient less than the thermal expansion coefficient of the elastic metal body 1, a compression stress will be generated on the composite glass layer 48 even in a state of being supplied with a filler (corresponding to filler B) that is higher in thermal expansion coefficient than the crystallized glass 46.

Thus, the thermal expansion coefficient of the crystallized glass 46 itself is inherent, but as proposed in the present invention, the thermal expansion coefficient can be increased or decreased by about 2 or 3% to 12 or 13% by making it composite by adding ceramic powder as a filler.

The rate of the filler added to the crystallized glass is desirable to be 5 wt % to 40 wt %. That is, the ratio of ceramic powder to crystallized glass comprising the composite glass is desirable to be in a range of 95:5 to 60:40 with respect to crystallized glass and ceramic powder. The reason for this is that, as described in FIG. 13B, in case the amount of filler added is less than 5 wt %, the thermal expansion coefficient of the finished composite glass layer 13a is less varied and it is sometimes unable to obtain the synergetic effect (being hard to be re-melted in the form of composite glass layer 48, the materials are hard to be mutually diffused after crystallization, and the thermal expansion coefficient can be increased or decreased as needed) of the advantage of the crystallized glass 46 (for example, the materials are mutually diffused with increase of the melting temperature after crystallization) that is the feature of composite glass 48 and the advantage of the ceramic powder 47 (for example, the materials are stable and hard to be mutually diffused, and the thermal expansion coefficient varies with the materials).

Also, in case the amount of the filler added exceeds 40 wt %, as shown in FIG. 13, the composite glass becomes hard to be sintered, and its strength is sometimes lowered. This is because the amount of glass needed for wetting the surface of the ceramic powder 47 is insufficient. It may cause fine holes or the like to be generated in the finished composite glass 48 or the insulating resistance to be lowered. Thus, the amount of the filler added is desirable to be 5 wt % to 40 wt % of the composite glass, and the thermal expansion coefficient can be increased or decreased in this range. Also, when adjusting the thermal expansion coefficient higher than this level, the adjustment can be made by selecting crystallized glass 15 having different thermal expansion coefficient and similarly adding various kinds of fillers thereto.

As the ceramic powder 47 added to the composite glass 48 of the present invention, it is desirable to use alumina ($Al_2O_3$, thermal expansion coefficient 6.5 to 8.0 ppm/° C.), MgO (thermal expansion coefficient 13 ppm/° C.), forsterite ($2MgO\ SiO_2$, thermal expansion coefficient 8 to 11 μm/° C. depending on the rate of composition), zirconia (thermal expansion coefficient 10.4 ppm/° C.), titanium oxide, calcium oxide, magnesium oxide, spinel ($MgO\ Al_2O_3$). Also, the average grain diameter of these is desirable to be about 0.01 to 5 μm. In case of less than 0.01 μm, it will cause the cost to become higher.

Also, in case the average grain diameter is larger than 5 μm, it is sometimes difficult to execute simultaneous burning with glass. Also, with respect to commercially available crystallized glass other than the crystallized glass proposed in the preferred embodiment, the fine adjustment of the thermal expansion coefficient of the finished glass composite material can be made by adding ceramic powder as a filler, and therefore, it is possible to do the optimum design of each product.

As ceramic powder, it is desirable to be 6 ppm/° C. to 15 ppm/° C. in thermal expansion coefficient. In the case of ceramic powder 23 whose thermal expansion coefficient is less than 6 ppm/° C. or greater than 15 ppm/° C., matching with the elastic metal body 1 is sometimes difficult even in the form of composite glass.

Particularly, since ceramic powder in composite glass hardly reacts with glass, it often remains as it is after burning as shown in FIG. 12. Accordingly, the thermal expansion coefficient of composite glass can be easily calculated by the proportional calculation of the thermal expansion coefficient of crystallized glass and the thermal expansion coefficient of ceramic powder added thereto.

FIG. 12 is the result of simplification, and when the cross-section of actual composite glass is analyzed by means of SEM (scanning electronic microscope) or XMA (X-ray micro-analyzer), the grain boundary formed by crystallized glass and the ceramic powder diffused thereto can be seen. Also, when these are subjected to element analysis, a plurality of elements (such as $MgO$, $SiO_2$, $Al_2O_3$) comprising the crystallized glass which are uniformly mixed in the crystallized glass may be detected, while inherent elements (the elements of alumina and oxygen in the case of using alumina as ceramic powder) may be detected in specifically high strength.

Also, when zirconia oxide is used as ceramic powder, the elements of zerconis and oxygen may be detected in specifically high strength, and since they can be detected in high concentration, it is easy to distinguish between the elements originally contained in the crystallized glass and those added as a filler for configuring the composite glass.

The total thickness of the composite glass 24 is desirable to be 10 μm to 200 μm at least. In case of less than 10 μm in thickness, it is liable to be subjected to influences due to pinholes generated during screen printing of the glass paste. Also, in case the thickness exceeds 200 μm, it will cause the cost of the glass to be increased.

Also, the method of manufacturing composite glass is a method of burning glass paste formed from crystalline glass and ceramic powder, and by using this method, it is also possible to manufacture composite glass formed from non-crystalline glass and ceramic powder. In this case, it is preferable to burn glass paste to burn glass paste at 800 to 900° C. which is prepared by blending both of the non-crystalline glass powder and ceramic powder at the specified ratio (the weight ratio of non-crystalline glass powder to ceramic powder is preferable to be 95:5 to 60:40). Burning at 800 to 900° C., the ceramic powder can be dispersed in the non-crystalline glass without giving damage thereto. Also, in this case, there is a possibility that some of the ceramic powder is dissolved in the non-crystalline glass, and most of the ceramic powder is dispersed as a kind of filler in the non-crystalline glass. Accordingly, by using a specified analyzing method (such as XMA), whether it is non-crystalline glass or ceramic powder dispersed therein can be distinguished.

Similarly, as to the non-crystalline composite glass prepared by blending non-crystalline glass with crystalline glass, the weight ratio of non-crystalline glass to crystalline glass is desirable to be 95:5 to 50:50. When the rate of non-crystalline glass exceeds 95 wt %, especially making it composite is not sometimes necessary. Also, in case the rate of non-crystalline glass is less than 50 wt %, it must be called composite glass based on crystalline glass rather than composite glass based on non-crystalline glass.

Also, the crystalline composite glass prepared by blending crystalline glass with non-crystalline glass, the weight ratio of crystalline glass to non-crystalline glass is desirable to be 95:5 to 50:50. When the rate of crystalline glass exceeds 95 wt %, especially making it composite is not sometimes necessary. Also, in case the rate of crystalline glass is less than 50 wt %, it must be called composite glass based on non-crystalline glass rather than composite glass based on crystalline glass. Also, as to the crystalinity of glass in the composite glass, it can be analyzed by means of XRD (X-ray diffraction) or the like. For example, in the case of non-crystalline $SiO_2$, a broad rise called halo can be observed. Also, in the case of crystalline $SiO_2$ (such as quartz), a plurality of sharp diffraction curves can be observed. Also, it is easy to specify the substance through analysis executed by combining commercially available substance analyzing software with the peak position (called d value) and the peak strength ratio of such diffraction figure.

When glass material is used as overcoat, the rate of lead oxide in the overcoat glass is desirable to be 60 wt % to less than 95 wt %. In case the amount of lead oxide is less than 60 wt %, the burning temperature will become higher and strain sensitive resistor $3f$ is subjected to heat re-treatment, and it may cause the resistance value and the temperature characteristics to be deviated.

Also, in case the rate of lead oxide is 95 wt % or over, the water resistance will be sometimes lowered. Also, the thickness of overcoat glass 14 is desirable to be 10 μm to less than 200 μm. In case of less than 10 μm, there is a possibility that pinholes are generated due to dust or bubbles. Also, in case the thickness of overcoat glass 14 is 200 μm or over, the overcoat glass 14 will run and excessively spread during burning, and it may cause defective patterns to be generated. Also, the overcoat glass 14 is desirable to be in two layer at least. With the overcoat glass printed in two layers at least, it hardly causes the generation of defects even when pinholes are generated in one of the layers due to dust or bubbles.

When resin is used for the overcoat layer, the resin layer is desirable to contain ceramic powder by 5 wt % to less than 50 wt %. With ceramic powder added to the resin layer, it becomes hard to be scratched because of the increased physical strength and the resultant increase in wear resistance. In case the amount of ceramic powder contained is less than 5 wt %, it is sometimes unable to obtain the effect of addition. In case the amount of ceramic powder contained is 50 wt % or over, the fluidity and filling property of the overcoat resin layer may be sometimes lowered. Also, the thickness of the overcoat resin layer is desirable to be 10 μm to less than 200 μm. In case of less than 10 μm, there is a possibility that pinholes are generated due to dust or bubbles. Also in case the thickness of overcoat resin layer is 200 μm or over, the overcoat resin will run and excessively spread during burning, and it may cause defective patterns to be generated. Also, the overcoat resin is desirable to be in two layer at least. With the overcoat resin formed in two layers at least, it hardly causes the generation of defects even when pinholes are produced in one layer of the overcoat due to dust or bubbles.

Also, in case the overcoat is in a plurality of layers, it is preferable to form the plurality of layers by layers of glass or resin, but also preferable to combine these. In this case, it is preferable to form the first overcoat layer based on glass or ceramic by 10 μm to less than 200 μm in thickness which is closer to strain sensitive resistor $3f$, and to form thereon the second overcoat layer based on resin by 10 μm to less than 200 μm in thickness, and in this way, it is possible to make the best use of the features of both.

In this case, from the relations of the heat treatment temperatures, it is desirable to form the overcoat with resin as main component on the overcoat with glass as main component. Overcoat material with resin as main component can be selected from the product numbers used for protection of various electric parts or for mounting of semiconductor bear chips. In case the thickness of such overcoat is less than 10 μm, there is a fear of generation of pinholes, and in case of 200 μm or over, it takes much time for forming the overcoat, causing the cost to become higher, and therefore, the thickness of each layer for a load sensor is desirable to be 10 μm to less than 200 μm.

Also, the thickness of wiring pattern is desirable to be 3 μm to less than 50 μm. In case of less than 3 μm, the electrode that forms wiring pattern 6 becomes too thin and may locally become unable to conduct, and it may cause the wiring resistance to become higher or the capacity component formed between the substrate and the first electrode to become lower than the design value. Also, in case the thickness of wiring pattern exceeds 50 μm, there is a fear of increase of the cost.

Also, ceramic component or ceramic member is desirable to be contained by 3 wt % over and less than 20 wt % in the wiring pattern. Glass component or ceramic member for forming composite glass is previously added into the wiring pattern, and in this way, the thermal expansion coefficient can be adjusted to the glass layer and further the adhesion to the glass layer can be increased, and it is possible to prevent the generation of interlayer peeling from the glass layer or the like. Here, in case the amount added is less than 3 wt %, such effect will sometimes lessen. Also, in case the amount added exceeds 20 wt %, it will cause the wiring resistance to increase. Particularly, since the thermal expansion coefficient is 2 or 3 times larger as compared with a ceramic substrate such as alumina substrate or the like as in a load sensor, some difference in thermal expansion coefficient may often cause the generation of defects such as interlayer peeling and the like.

When composite glass layer is formed in a plurality of layers, the thickness per layer is desirable to be 5 μm to 70 μm. In case of less than 5 μm, it may be sometimes unable to obtain necessary insulation. Also, in case of over 70 μm per layer, it may cause spreading or running of the ink during printing, making it difficult to execute highly accurate printing.

The glass layer, composite layer, and electrode layer are desirable to be burnt in an oxidation atmosphere at 800 to 900° C. In case it is lower than 800° C., sufficient sintering temperature may not be obtained. Also, in case it exceeds 900° C., it may cause the burning cost to become higher and the strength of the elastic metal body to be lowered, and it will be sometimes necessary to use an expensive metallic substrate assuring more excellent heat resistance.

(Preferred Embodiment 12)

As the preferred embodiment 12, the method of manufacturing composite glass paste will be described in the following. FIG. 14 explains about a possibility that pinholes are produced in composite glass. In FIG. 14, reference numeral 49 is ceramic powder aggregate, and numeral 50 is pinhole. As shown in FIG. 14, when ceramic powder 47 is uniformly dispersed in crystallized glass 46, there is no generation of such pinhole 50, but in case of insufficient dispersion of ceramic powder 47, causing ceramic powder aggregate 49 to be generated, and as shown in FIG. 14, pinhole 50 is sometimes generated. This is because the ceramic powder is not sintered at the burning temperature of the crystallized glass. Particularly, when ceramic powder in a state of forming aggregate remains in the composite glass, it may cause the generation of pinhole 50 although the possibility is very slight.

The purpose of preventing such pinhole 50 can be achieved by making uniform the dispersion of ceramic material in the composite glass.

Next, the method of manufacturing composite glass paste is described by using FIG. 15 and FIG. 16. FIG. 15 and FIG. 16 describe the method of manufacturing composite glass paste.

In the preferred embodiment 12, ceramic powder used for composite glass is previously dispersed in solvent, to which glass powder is added and kneaded. In this way, glass powder and ceramic powder are separately dispersed under respectively optimum condition, and thereby, it is possible to provide composite glass paste containing no agglomerate of ceramic powder.

In FIG. 15A, reference numeral 51a to 51d are specified materials, and specifically, they are ceramic powder, solvent, dispersant, and some resin. These specified materials as shown in FIG. 15B are dispersed by beads 53 in dispersing device 52. As the dispersing device 52, it is desirable to employ an agitation type, vibration type or rotary type dispersing device using beads such as a rotary ball mill, and Shinmaru Enterprises Corporation's Dyno-Mill.

The wettability of ceramic powder can be improved by adding a solvent and a small amount of dispersant, or some resin depending on the kind of resin to the ceramic powder. In this case, if too much resin is added, it will naturally cause the viscosity to become increased making it difficult to disperse by beads, and therefore, when resin is added, it is limited to a small amount and dispersed by means of such dispersing device, thereby enabling dispersion without agglomerate.

In the dispersion, the viscosity of slurry formed from ceramic powder, solvent, dispersant or some resin is desirable to be 1 cp (centi-poise) to 10 p (poise). In the case of slurry whose viscosity is within 1 cp, even when the ceramic powder is sufficiently dispersed in the dispersing device, it is too low in viscosity, and precipitates when it is taken out and filtered. Also, when the slurry viscosity exceeds 10 poise, the purpose of dispersion cannot be achieved in a dispersing device using beads, and it is sometimes difficult to remove beads and slurry. When beads are used, beads are desirable to be 10 mm or less in size. Smaller beads may bring about higher dispersing effects for finer ceramic powder, but bumping energy of beads against each other is lessened, and therefore, it is desirable to use a dispersing device using power higher than specific horse power. In the case of such dispersing device, a rotary type in particular, although it depends on the performance of rip seal (a type of sealing mechanism of dispersing device), it should be noted that there is sometimes inconvenience in handling beads being less than 0.3 mm in diameter. Also, as a material for beads, commercially available alumina or zirconia (desirable to contain yttria) is desirable. Also, by selecting a material for beads same in component as ceramic powder, even in case beads 29 polished are mixed in the slurry as impurities, the resultant influence can be prevented.

Slurry thus prepared is filtered as shown in FIG. 15C. In FIG. 15C, reference numeral 55a is a filtering device, and numeral 56a is a filter. The slurry as shown by the arrow 54 in FIG. 15C is filtered by the filter 56a set on the filtering device 55a, and then collected into the container 57a.

As the filter 56a, commercially available screen with opening of 10 to 20 μm can be used, but with use of a filter with fiber formed in spool-like shape that is called depth type (volume filtration type), it is possible to filter a large volume of slurry while minimizing the pressure loss (that is, in a state such that the filter is hardly clogged). Also, such filtration may be done with the weight of slurry itself, but the operational efficiency can be enhanced by using air pressures (compressed air) or diaphragm pump or the like. In this way, the slurry is poured and filtered as shown by the arrow 18c in FIG. 15C and is collected into the container 57a as shown by the arrow 54.

Next, with reference to FIG. 16A to FIG. 16D, how the composite glass paste is prepared by using ceramic powder dispersed without agglomerate is explained.

Figure 16A:
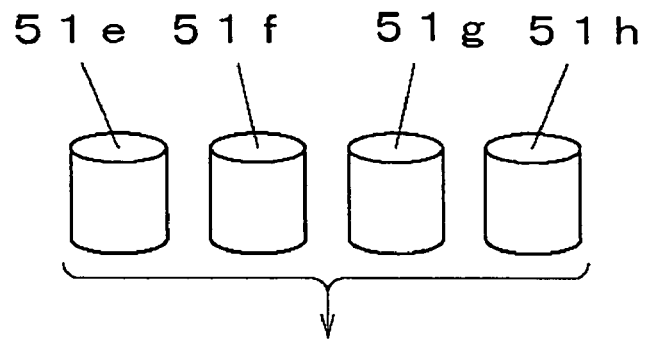

First, in FIG. 16A, specified materials 51e to 51h are slurry with ceramic powder dispersed. These materials 51e to 51h are collected into the container 57a shown in FIG. 15C such as crystallized glass powder, resin, dispersant and the like. Here, hardening type resin can be used as the resin. Also, part of the resin can be used as dispersant. Also, with coloring agent or the like added in advance as needed, it becomes easier to check the thickness of each layer by colors and elements, thereby facilitating the product management.

Figure 16B:
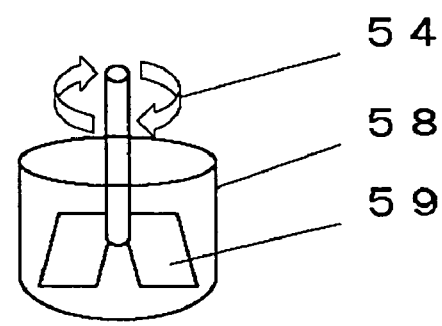

In FIG. 16B, reference numeral 58 is a kneader, in which a specified stirring jig 59 is installed. As such kneader 58, a planetary mixer, kneader, auto mortar or the like can be used. Thus, since the stirring jig 59 is set in the kneader 58, it is possible to reliably knead a material with high viscosity. Particularly, in the case of a load sensor proposed in the present invention the cost can be lowered by using screen printing for printing of the composite glass paste.

However, in screen printing of the composite glass paste, if the viscosity is too high, the pattern may spread after printing or the specified thickness may not be obtained, and the viscosity is required to be higher than a specific level. Accordingly, when kneading such composite glass, the viscosity is often very high (for example, it is in a state of clay as hard as 20000 to 30000 poise or over, and does not flow at all with its own weight), and it is desirable to employ the kneader 33 provided with such stirring jig 34.

As shown in FIG. 16B, the specified materials 51e to 51h are thrown into the kneader 58 respectively as specified, and kneaded as the built-in stirring jig 59 rotates in the direction of the arrow 54. It is desirable to properly add the materials in such order that they will not react with each other. For example, if slurry powder and resin or slurry and glass powder are kneaded together in great quantities, it may sometimes result in generation of agglomerate. The generation of such agglomerate (for example, it is also called solvent shock) can be prevented by adding the materials little by little or by previously assuring the combinations that hardly result in generation of agglomerate.

Figure 16C:
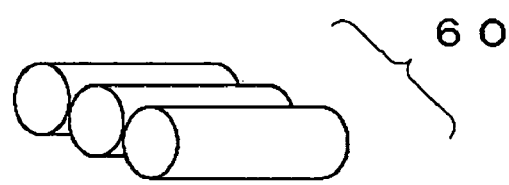
Figure 16D:
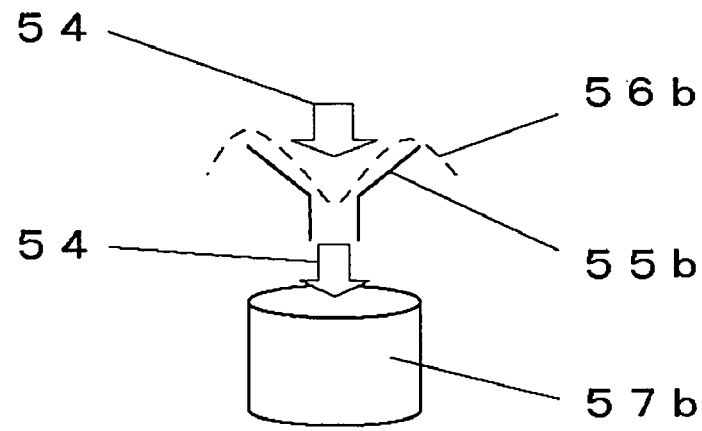

And, as shown in FIG. 16C, by kneading with use of a kneader having three rolls 60 or the like, it is possible to uniformly disperse the ceramic powder and glass powder in the slurry for making the composite glass paste.

Finally, as shown in FIG. 16C, dirt and agglomerate in the composite glass paste can be removed by filtering with use of the filtering device 55b and filter 56b.

Detailed description will be given in the following. First, as an example, composite glass paste was prepared as shown in FIG. 15A to FIG. 15C and FIG. 16A to FIG. 16D.

Ceramic powder was previously dispersed to make it into slurry, and after filtering, it was mixed with crystallized glass powder as shown in FIG. 15A to FIG. 15C, thereby preparing the composite glass paste.

First, in FIG. 15A, ceramic powder was used as specified material 51a. Specifically, commercially available alumina powder (200 or 300 yen/kg) was employed, which is 0.4 μm in grain diameter but inexpensive containing a great deal of agglomerate. Next, a little amount of solvent slightly exceeding the amount of oil absorbed (the detail of oil absorption is mentioned in JIS-K5101), solvent (butyl carbitol acetate or the like), and dispersant were added to prepare alumina slurry being high in concentration but low in viscosity, which was then dispersed by using a commercially available beads mill for a specific length of time. Alumina beads with diameter 2 mm were used. The alumina thus dispersed and prepared was evaluated by using a grind meter (the detail is mentioned in JIS-K5600), but agglomerate of 3 μm or over was not detected. Also, the grain distribution of the alumina slurry was measured by using a viscosity distribution meter, and it has been confirmed that the distribution has reached the primary particle level.

Also, since a specified amount of dispersant is added to the alumina slurry, although it was high in concentration (alumina content 60 wt % or over, preferably 80 wt % or over) but less than 10 poise in viscosity (shear rate in a range from 1/s to 100/s), the dispersion was stabilized after lapse of 24 hours. When the alumina slurry is stored for a long period of time, the precipitation of slurry and the re-agglomeration of ceramic powder can be prevented by properly keeping it rotated in a state of being set on a rotary stand or the like. The alumina slurry thus prepared was filtered without problems by a filter with 10 μm opening as shown in FIG. 15C. Subsequently, as shown in FIG. 16A, the alumina slurry was premixed with glass powder, weighed with other binder or the like, as shown in FIG. 16B, and finally, kneaded by rolls as shown in FIG. 16C. The composite glass paste thus prepared was filtered without problems by using a filter of 20 μm. After that, it is completed by adjusting the viscosity. The viscosity is desirable to be 10 poise to 10000 poise. If the viscosity is in other range than this, it will be sometimes difficult to print.

A load sensor as shown in FIG. 15 was manufactured by using the composite glass paste thus prepared, and there were no particular problems. Also, the cross-section was analyzed by SEM and XMA, obtaining the results as shown in FIG. 12, and alumina uniformly dispersed in crystallized glass 23a was detected.

In this way, for dispersing ceramic powder without agglomerate, it takes a great deal of man-hour, and it is desired to reduce the cost and improve the efficiency in the execution of such dispersion. In that case, the dispersion efficiency can be enhanced and the manufacturing cost can be lowered by making the ceramic slurry high in concentration. Particularly, it is important to disperse the ceramic slurry in high concentration (for example, with the amount of solvent ranging from 10% to 50% higher than the amount of oil absorbed). If the amount of solvent is less than the amount of oil absorbed, the viscosity of the ceramic slurry will be too high, the dispersion of beads will be hard to take place. Also, if it is 100% higher than the amount of oil absorbed (that is, when the amount of oil absorbed is 50 g that is measured according to JIS, then the amount of solvent added is 100 g), the viscosity of the ceramic slurry is low enough, but the amount of solvent is excessive, and in the composite ink composition, the amount of solvent increases too much and it is sometimes necessary to reduce the solvent during the operation.

(Preferred Embodiment 13)

In the preferred embodiment 13, elastic metal body used in the present invention will be further described in detail.

In the present invention, since the crystallized glass is burned on an elastic metal body, it is naturally excellent in heat resistance, but further required to have a bearing force. In order to achieve such purpose, it is preferable to use austenite alloy or age-hardening alloy (especially, Ni-base alloy), Co-base alloy (such as inconel), or ferrite type, austenite type heat resisting steel properly as needed. For example, using ferrite type heat resisting alloy, it becomes easier to execute highly accurate machining of a strain sensor, and also, it is possible to lessen residual stresses, machining strain or the like in the later process. Also, aluminum being previously contained in the elastic metal body as needed, aluminum added during heat treatment forms aluminum film oxide on the elastic metal body, thereby-improving the heat resistance and oxidation resistance. Further, alumina being previously added to the crystallized glass, it is effective to greatly improve the adhesion (peeling strength) in heat treatment to the elastic metal body containing aluminum.

As such members, SUS304, 316, 404, 430, S17 and SUS444 are appropriate as the alloys of 300 and 400 series of AISI (American Iron and Steel institute) type.

Also, other types of elastic metal body can be used by executing heat resisting treatment on the surface. Such alloy has one thermal expansion coefficient fixed in a range from $90 \times 1E-7$ to $140 \times 1E-7/°$ C. according to the composition. However, as a load sensor, when machined into a predetermined shape, strain remains in the elastic metal body during machining, and when glass paste is printed and burnt thereon, it may often cause deformation more than the level of the original thermal expansion coefficient.

For example, the metal substrate is warped exceeding the warp of the substrate calculated from the difference in thermal expansion coefficient between glass and metal substrate. For example, even in use of same SUS material, the amount of warp varies with thickness such as 0.5 mm, 2 mm and 5 mm in press machining (punching) to form a predetermined shape of substrate. Particularly, even in use of same metallic material, the change in thickness naturally causes the machining size to be changed, and the amount of warp varies with the machining pressure, method, procedure, dies or the like even in use of metallic materials being same in composition. As a measure against such warp, warp correction can be executed after machining, but it is difficult to completely eliminate residual stresses and the amount of deformation in heat treatment by executing warp correction.

Accordingly, when a load sensor is formed on the surface of a metal substrate machined into such a predetermined shape and internally having residual stresses, it is necessary to make matching the thermal expansion coefficients of glass in accordance with such warp. In that case, as proposed in the present invention, by making crystallized glass or non-crystallized glass into composite glass, the fine adjustment of thermal expansion coefficient can be made with use of same material, and therefore, it is possible to cope with the problem of warp even in such machining method by taking a proper measure on the glass side.

The thickness of elastic metal body used in the present invention is desirable to be 1 mm or over. As shown in FIG. 11A to FIG. 11B, in case the thickness of elastic metal body is less than 1 mm, the elastic metal body will bend even due to a weak force, and therefore, the glass layer is hard to crack or peel even if there exists some difference in thermal expansion coefficient between the glass and the elastic metal body. On the other hand, in the case of the present invention, the difference in thermal expansion coefficient between glass and elastic metal body can be adjusted even when the thickness of the elastic metal body is 1 mm or over (or even when it is hard to deform as in 5 mm or over).

Thus, the upper limit of thickness of the elastic metal body used in the present invention is not subjected to any limitations. Practically, however, if the thickness of the elastic metal body exceeds 1 mm, the cost of the heat treating device for forming glass layers will become higher. Also, the uneven heat is increased during heat treatment, and the thickness of the elastic metal body is desirable to be 1 mm or less. However, even in case the thickness of the elastic metal body exceeds 1 mm, there will arise no particular inconvenience provided that it is possible to execute uniform heat treatment (at set temperature ±5 to 10° C. if possible).

The heat resistance of elastic metal body can be improved by previously adding aluminum thereto. This is because the aluminum added is diffused on the surface during burning of glass or the like, thereby forming an aumina layer. In that case, alumina being previously added to all the crystallized glass layer and non-crystallized glass layer, the alumina becomes a common element of both layers and it is possible to improve the interlayer adhesion and matching property and to improve the durability as a load sensor. The amount of aluminum (or alumina) added is desirable to be 1 wt % or over. In case of less than 1 wt %, it is sometimes unable to obtain the intended effect. Similarly, by previously adding alumina as a common element to three layers of crystallized glass layer, non-crystalline glass layer and strain sensitive resistor, it is possible to improve the interlayer matching in simultaneous burning of the three layers. Also, the matching between strain sensitive resistor and non-crystalline glass layer can be improved, and consequently, the electrical characteristics of the load sensor are stabilized.

Also, the wiring is partially connected to the strain sensitive resistor, forming a predetermined bridge circuit (such as Wheatstone's bridge), which are electrically connected to each other via internal electrode through a plurality of via-holes formed in the crystalline glass layer and non-crystalline glass layer. Thus, by using internal electrode for multi-layer wiring, chip parts or semiconductor parts can be mounted in high density, and it is possible to realize the miniaturization and cost reduction of the load sensor.

Also, the wiring partially connected to the strain sensitive resistor is desirable to be such that at least Ag is 60 wt % to 90 wt % and $Bi_2O_3$ is 5 wt % to 30 wt %. In case silver is less than 60 wt %, it results in higher wiring resistance, and there is a possibility that an error is generated in the bridge circuit. Also, in case silver is over 90 wt %, soldering causes the silver to be affected, sometimes lowering the tensile strength after soldering. Also, in case $Bi_2O_3$ is less than 5 wt %, it sometimes results in lowering of adhesion to the surface, and if it exceeds 30 wt %, surplus $Bi_2O_3$ may sometimes spread (or run) at the periphery of wiring pattern.

(Preferred Embodiment 14)

In the preferred embodiment 14, the method of forming composite glass paste on an elastic metal body will be described. It is also possible to directly form composite glass paste on an elastic metal body by means of screen printing. Also, it is possible to print such paste previously in specified pattern on other support film (for example, PET film) and to transfer it onto an elastic metal body, which is followed by burning together with the elastic metal body in an oxidation atmosphere at 800 to 900° C.

Also, it is possible to contintiously form such composite paste into sheet form on a support film by using a coating machine (ceramic green sheet forming device or the like), and to transfer it onto the elastic metal body after punching into a predetermined shape by means of a die, followed by burning together with the elastic metal body in an oxidation atmosphere at 800 to 900° C. In this way, since the printing object is a film instead of an elastic metal body, it is possible to execute continuous printing and to lower the printing cost. Also, since it is a sheet form, pinholes in the coated layer, a conventional problem in printing, can be prevented, and thereby, the product yield can be enhanced. Regarding such effects, you may refer to for example Japanese Laid-open Patent 2003-69192.

The strain sensitive resistor is desirable to contain at least 10 to 30 wt % of PbO, 10 to 60 wt % of $SiO_2$, and 5 to 30 wt % of ruthenium compound. In the case of such strain sensitive resistor, when PbO is less than 10 wt %, GF (gauge factor, corresponding to change in resistance value as against strain, and higher GF is desirable as it results in higher sensitivity) is sometimes too low. Also, when PbO exceeds 30 wt %, the resistance value of the strain sensitive resistor becomes too high, and it is sometimes hard to simplify with a semiconductor chip even in combination with a bridge circuit.

Also, when $SiO_2$ is less than 10 wt %, GF is sometimes low. Also, when it exceeds 60 wt %, the resistance value becomes too high, and it is sometimes hard to make matching with the input of semiconductor chip used. Also, in case the ruthenium compound is less than 5 wt %, it sometimes causes the resistance value to become too high or GF to become too small. Also, in case of over 30 wt %, the price of resistor paste becomes high and the resistance value becomes too low, making it difficult to match the input specification of semiconductor chips or increasing the total power consumption of the load sensor. Also, as ruthenium compound, there are RuO, PbRuO compound (such as $Pb_2Ru_2O_{6.5}$), PbBiRuO ($Pb_3Bi_2Ru_4O_{14}$, $Pb_4Bi_2Ru_3O_{19}$, $PbBi_2Ru_3O_{10}$, etc.). Such ruthenium compound is an example of ruthenium compound optimized out of resistors with high GF, and actually, it is an example analyzed by XD (X-ray diffraction) with use of commercially available data base (JCPDS), and other pyrocroa type (RuPbO type) can be used in the present invention.

The thermal expansion coefficient of crystallized glass is desirable to be 8 ppm/° C. or over, less than 14 ppm/° C., or the difference in thermal expansion coefficient from elastic metal body is desirable to be less than 3 ppm/° C. In the case of other ranges, it is sometimes unable to obtain a sufficient bearing force as a load sensor. Also, the crystallinity of crystallized glass is desirable to be 20% or over. In case the crystallinity of crystallized glass is less than 20%, it is sometimes unable to obtain characteristics as crystallized glass. As for the crystallinity, the evaluation can be executed by X-ray diffraction.

It is desirable to execute burning at 400° C. or over in an oxidation atmosphere. The purpose is to completely decompose organic components remaining in glass and electrode paste. If the burning atmosphere is not an oxidation atmosphere, the decomposition of organic components is insufficient and they remain in the glass, sometimes causing the reliability to be lowered. Also, if the air applied into the burning furnace is insufficient, the atmosphere will change into a reduction atmosphere, causing lead oxide or the like to be reduced and the characteristics to be deteriorated.

INDUSTRIAL APPLICABILITY

A load sensor and its manufacturing method, paste used and its manufacturing method related to the present invention optimize the glass material used for the manufacture of a load sensor, and enable simultaneous burning of multiple layers, and further, are able to widen the selective range of elastic metal bodies, which are therefore useful for a smart air bag or the like to be mounted in a car.

The invention claimed is:

1. A load sensor wherein a crystalline glass layer is formed by 10 to 200 μm in thickness on each side of an elastic metal body while an internal electrode of less than 50 μm in thickness is buried therein;
   a non-crystalline glass layer is formed by 5 to 100 μm in thickness on said crystalline glass layer;
   a silver wiring and a strain sensitive resistor are formed by 5 to 50 μm in thickness each on said non-crystalline glass layer;
   said internal electrode is connected to a part of said wiring via holes formed in said crystalline glass layer and said non-crystalline glass layer; and
   a protective layer of 200 μm or less in thickness is formed so as to cover at least said strain sensitive resistor.

* * * * *